US012576879B1

(12) United States Patent　　　(10) Patent No.:　US 12,576,879 B1
Dolan et al.　　　(45) Date of Patent:　Mar. 17, 2026

(54) CONVERSION OF DRIVING LOGS TO SIMULATIONS FOR AUTONOMOUS VEHICLE TESTING AND VALIDATION

(71) Applicant: Zoox, Inc., Foster City, CA (US)

(72) Inventors: James Graham Dolan, Sarasota, FL (US); Jonathan Michael Edward Hogins, Renton, WA (US); Marianna Hajar Neubauer, Seattle, WA (US)

(73) Assignee: Zoox, Inc., Foster City, CA (US)

( * ) Notice: Subject to any disclaimer, the term of this patent is extended or adjusted under 35 U.S.C. 154(b) by 48 days.

(21) Appl. No.: 18/311,180

(22) Filed: May 2, 2023

(51) Int. Cl.
　　*B60W 60/00*　　　(2020.01)
(52) U.S. Cl.
　　CPC ..... *B60W 60/001* (2020.02); *B60W 2420/403* (2013.01); *B60W 2554/4049* (2020.02)
(58) Field of Classification Search
　　CPC . B60W 2050/0028; B60W 2050/0031; B60W 60/001; B60W 2420/403; B60W 2554/20; B60W 2554/40; B60W 2554/404; B60W 2554/4049; B60W 2554/60; B60W 2554/80; B60W 2554/4048; G06V 10/74; G06V 10/75; G06V 10/757; G06V 10/761; G06V 10/82
　　See application file for complete search history.

(56) References Cited

U.S. PATENT DOCUMENTS

| | | | | |
|---|---|---|---|---|
| 10,755,007 | B2 | 8/2020 | Shum et al. | |
| 11,150,660 | B1 * | 10/2021 | Kabirzadeh | ............. G06F 30/15 |
| 11,465,652 | B2 * | 10/2022 | Li | ....................... G01C 21/3807 |
| 12,030,509 | B1 * | 7/2024 | Nygaard | ......... B60W 30/18163 |
| 2013/0016216 | A1 | 1/2013 | Nentwig et al. | |
| 2018/0267538 | A1 | 9/2018 | Shum et al. | |
| 2018/0349785 | A1 | 12/2018 | Zheng et al. | |
| 2019/0294934 | A1 | 9/2019 | Shestak et al. | |
| 2019/0310650 | A1 | 10/2019 | Halder | |
| 2021/0271259 | A1 * | 9/2021 | Karpathy | ............. G06V 10/774 |
| 2021/0286925 | A1 | 9/2021 | Wyrwas et al. | |
| 2021/0370972 | A1 * | 12/2021 | Bagschik | ................ G06F 30/27 |
| 2022/0204009 | A1 | 6/2022 | Choi et al. | |
| 2022/0245312 | A1 | 8/2022 | Wyrwas et al. | |
| 2022/0318464 | A1 * | 10/2022 | Xu | ....................... G05D 1/0212 |
| 2023/0202511 | A1 | 6/2023 | Atsmon et al. | |
| 2023/0222267 | A1 | 7/2023 | Muehlenstaedt et al. | |
| 2024/0046516 | A1 * | 2/2024 | Anciukevicius | .......... G06T 7/75 |

(Continued)

FOREIGN PATENT DOCUMENTS

CN　　110598637 A　　12/2019

OTHER PUBLICATIONS

United States Non-Final Office Action dated Jan. 3, 2025 for U.S. Appl. No. 18/311,168.

(Continued)

*Primary Examiner* — Brandon Z Willis

(74) *Attorney, Agent, or Firm* — EIP US LLP

(57) ABSTRACT

Techniques are described herein for converting driving logs to driving simulations and for analysis and improvement of said conversion. Log data may be received and an object may be identified. It may be determined that a plurality of models does not contain a sufficient model for representing the object in a driving simulation, and a machine-generated model may be generated for representing the object in the driving simulation. A driving simulation may then be generated including the model.

20 Claims, 7 Drawing Sheets

(56) References Cited

U.S. PATENT DOCUMENTS

| | | |
|---|---|---|
| 2024/0070516 A1 | 2/2024 | Patel et al. |
| 2024/0169126 A1 | 5/2024 | Zaferopoulos et al. |
| 2024/0311269 A1 | 9/2024 | Montali et al. |
| 2024/0378344 A1 | 11/2024 | Mukundan et al. |

OTHER PUBLICATIONS

United States Final Office Action dated Jun. 16, 2025 for U.S. Appl. No. 18/311,168.
United States non-final Office Action dated Oct. 7, 2025 for U.S. Appl. No. 18/311,168.

* cited by examiner

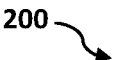

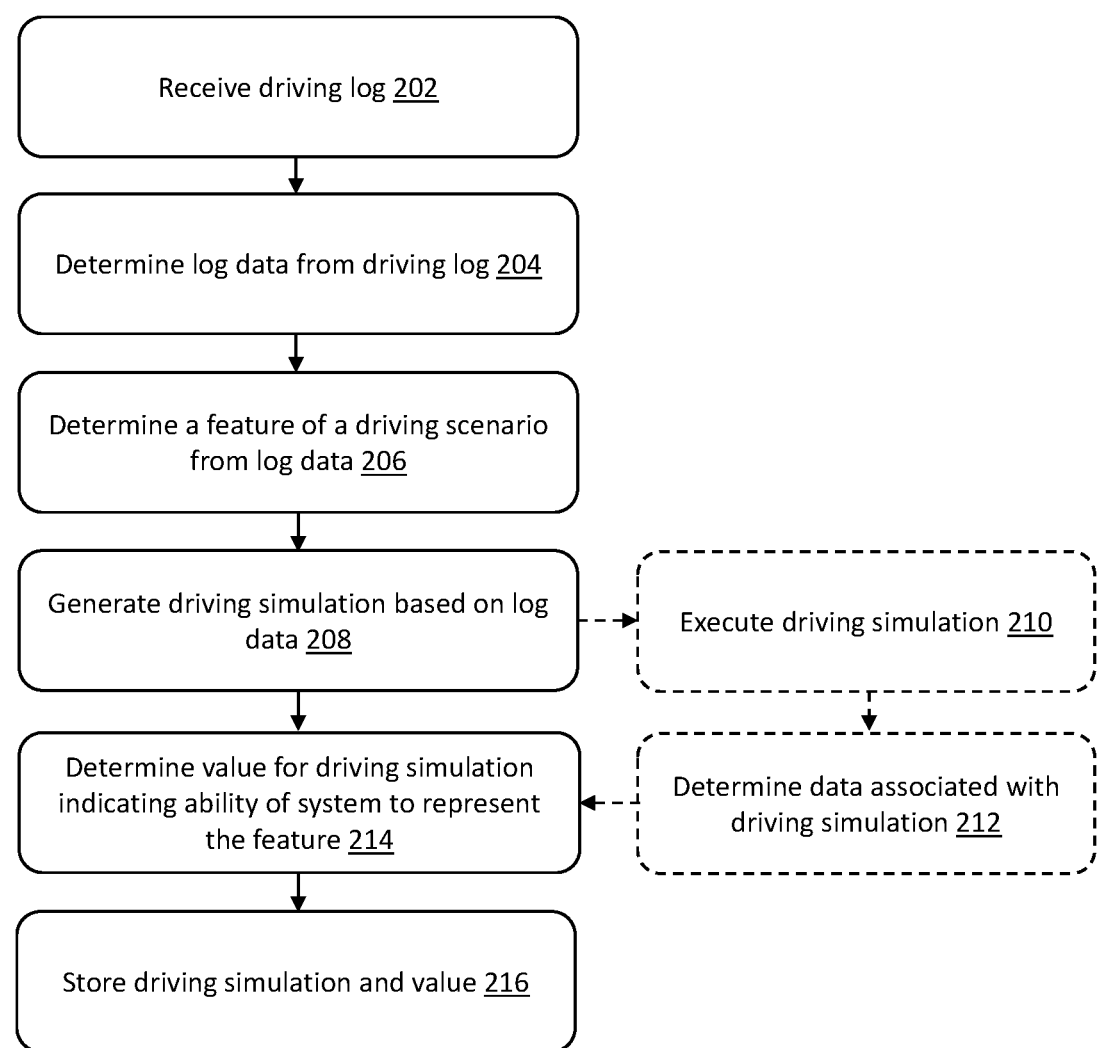

200

Receive driving log 202

Determine log data from driving log 204

Determine a feature of a driving scenario from log data 206

Generate driving simulation based on log data 208

Execute driving simulation 210

Determine value for driving simulation indicating ability of system to represent the feature 214

Determine data associated with driving simulation 212

Store driving simulation and value 216

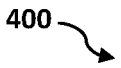
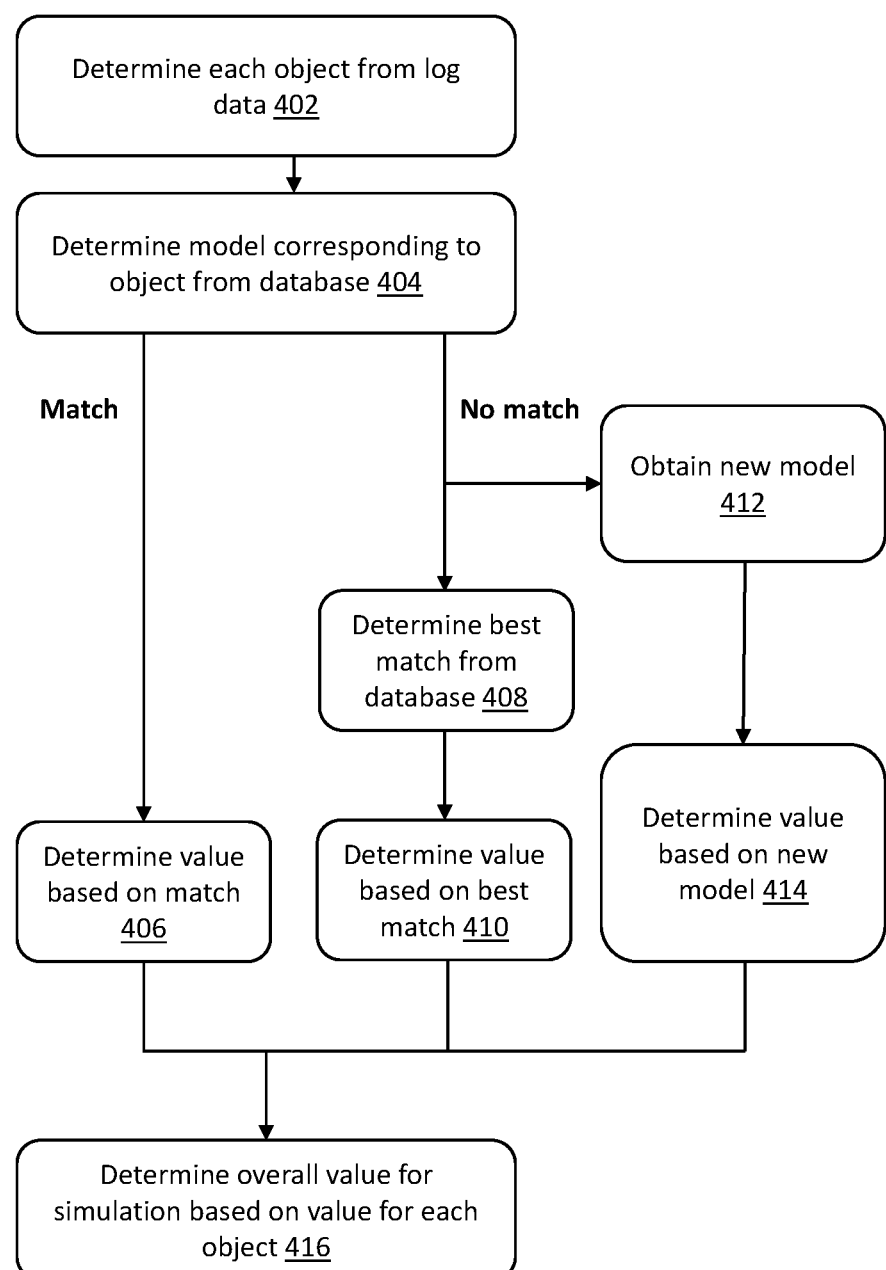
400
Determine each object from log data 402
Determine model corresponding to object from database 404
Match
No match
Obtain new model 412
Determine best match from database 408
Determine value based on match 406
Determine value based on best match 410
Determine value based on new model 414
Determine overall value for simulation based on value for each object 416
FIG. 4

600

CONVERSION OF DRIVING LOGS TO SIMULATIONS FOR AUTONOMOUS VEHICLE TESTING AND VALIDATION

BACKGROUND

Autonomous operations and control in vehicles is becoming more common. It is important to test and validate systems and models on which such autonomous control is based. Testing and validation may require large amounts of test data in order to expose the systems and models to many different scenarios. Test data may be generated by driving physical test vehicles on real roads or on test tracks. However, this is costly because a large number of test vehicles may be required and/or the test vehicles may need to be driven for long periods of time in order to gather the requisite amount of test data. As an alternative or supplement to test vehicles, simulations may be used, in which simulated vehicles are driven in a simulated environment. Simulation can generate large amounts of data for testing and validation more quickly and at lower cost. It is useful to ensure that a simulation is sufficiently realistic to output test data that can be used.

BRIEF DESCRIPTION OF DRAWINGS

The detailed description is described with reference to the accompanying figures. The use of the same reference numbers in different figures indicates similar or identical components or features.

FIG. 2 depicts a flow chart of a process for determining log conversion confidence according to the present invention.

FIG. 4 depicts a second example of determining a value indicating an ability of a system to represent a feature in simulation according to the present invention.

DETAILED DESCRIPTION

Figure 1:
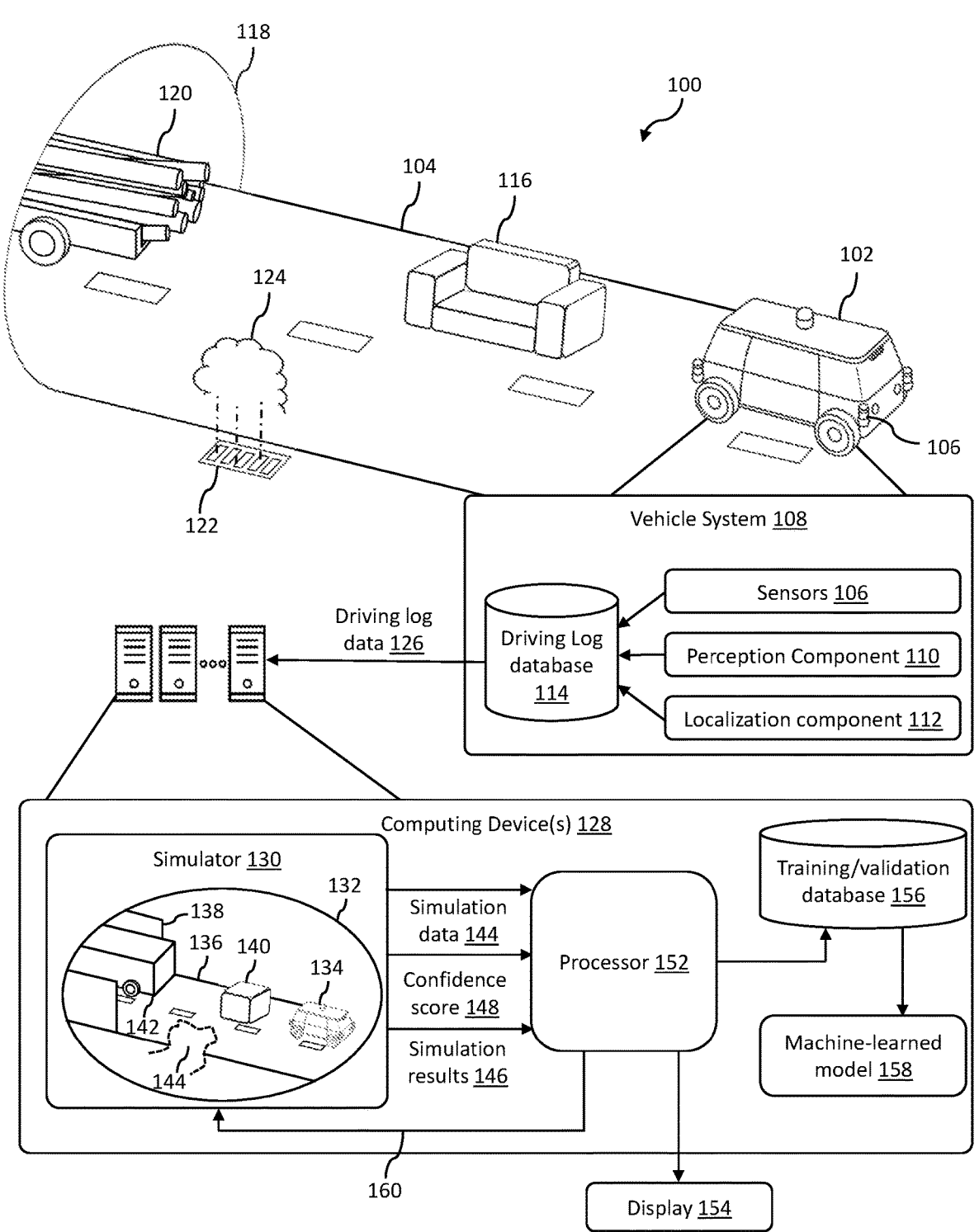
FIG. 1 is a pictorial diagram of a process for determining log conversion confidence according to the present invention.

This application relates to techniques including methods, systems, and computer-readable media for generating simulations from driving log data, the execution of those simulations, and the analysis, improvement, and use of the simulations and their results. More specifically, the techniques described in this application describe how a simulation may be analyzed to determine how well the driving log data or at least a portion thereof was able to be represented in the simulation. Techniques described herein also relate to the use of such simulations and to improvements to simulations generated from driving log data in situations where a feature or features of the driving log data or of a real driving scenario were unable to be accurately represented by a previously validated model.

A driving simulation may be generated based on driving log data, which may be referred to as 'log data', representing a driving scenario. Log data may be real log data or simulated log data. Real log data may represent a real driving scenario, as driven by a real vehicle in a real environment. Simulated log data may represent a simulated driving scenario, as driven by a simulated vehicle in a simulated environment. Alternatively, simulated log data may be generated in simulation based on a real driving scenario. The log data may be gathered while a vehicle drives through an environment. The log data may indicate features of the environment, objects, or actions of those objects that were perceived or determined by systems of the vehicle and/or may include raw sensor data relating to the objects or features. Log data for a journey, a portion of a journey, or a set of journeys may be converted to generate a driving simulation. During the conversion, a simulated environment and simulated objects may be generated that correspond to those in the log data. In some examples, the simulation may include a model or representation that does not entirely correspond to the environment or an object. For example, an object may be difficult to represent accurately in a simulation, which may be because the vehicle was unable to recognize the object, because the log data lacks sufficient information to identify, render, or otherwise represent the object, such as a lack of location data for the object, or because a database of models for simulated objects may lack a model corresponding to the object. A feature of the environment that may be unsupported by the system tasked with generating the simulation may be represented in simulations in a way that changes how a simulated vehicle interacts with that feature when compared with how the vehicle may have interacted with the feature in the driving log. In other examples, the feature being unsupported by the system may cause unusual results when the simulation is executed. Differences in interaction or unusual results during a simulation may result in a simulated vehicle, such as a simulated autonomous vehicle whose systems and reactions are being tested by executing the simulation, to act in an undesirable or unverifiable way. If the simulation does not accurately represent the driving log data, the cause of the undesirable or unverifiable reactions of a vehicle may be difficult to diagnose.

Because of this, it may be desirable to understand the usefulness of the simulation for testing proposed or existing vehicle systems and/or for the purpose of training or validation of a machine-learned model for autonomous driving. The usefulness of the simulation may be determined in a way that allows better comparison between simulations, as well as to enable analysis of the simulations. The usefulness may be determined based on how well a system was able to convert log data of a driving scenario, or a portion of the log data related to one or more features, to a driving simulation. This ability to convert log data to a driving simulation may be quantified to allow comparison to be performed. Accordingly, techniques described herein include the generation of a driving simulation from log data and determining a score or value that indicates how well the system was able to represent the driving scenario. The score or value, which may be referred to as a confidence score, may indicate an ability of a system to represent the scenario in the simulation based on capabilities of the simulator. The score may comprise an overall score for the simulation. An overall score may be based on a plurality of contributory scores associated with the conversion of specific features or groups of features within the driving log. For example, a first score may be determined relating to the conversion of environmental features and a second score may be determined relating to the conversion of objects, and the first and second scores may be combined to determine an overall score for the simulation.

Environmental features may include architectural features such as buildings, bridges, tunnels, over- and underpasses, junctions, flyovers, types of road, sculpture, geographical features such as hills, lakes, and open areas, or weather types. Objects may include other vehicles including cars, trucks, bicycles, motorcycles, scooters, buses, taxis, and trams, pedestrians, animals, static objects, roadworks, road or street furniture, maintenance objects or vehicles, or road features such as traffic calming measures or islands. In some examples, one or more scores may be based for a feature of the scenario, such as clouds of particulate matter, vapors, aerosols, or other items such as steam, smoke, fog, or a swarm of insects. Such features may be transient and/or may occlude, partially or fully, the environment behind them without having a solid form. As a result, these features may affect how a sensor perceives its environment. Other features that may affect how a sensor perceives an environment include reflections from reflective surfaces, weather conditions, and/or glare due to weather conditions. Such features may cause false positives in raw sensor data.

A simulation may be stored with other simulations in a database, for future use. Simulations may be executed and results from executing the simulation may also be stored. The simulation, an indication of the simulation, and/or the results may be stored with the score. The score may be used to determine whether the simulation may be used for training, validation, or other testing of a machine-learned model. The machine-learned model may be a model of a perception system, a prediction system, or a planner system, for example. The simulation or results from the driving simulation may be included in a dataset based on the score, and the dataset may be used to train or validate the machine-learned model. Alternatively, the score may be used to 'cull' data from a dataset, i.e. a simulation may be included in a dataset and a score may be determined for the simulation. Based on the score, the simulation may be retained or removed. Machine-learned models tested, validated, or trained based on a dataset may subsequently be used for operation of an autonomous vehicle in real driving scenarios.

Scores such as those described above may be determined based on one or more different factors. A score may be based on a difference between an object or feature that is in the log data and its simulated counterpart. A difference may comprise a difference in size, shape, color, texture, material, or type of the object or feature. A difference may comprise a difference in a bounding box or other metadata associated with an object.

In some examples, a score may be based on the presence of a particular object or feature in the driving log data. For example, driving log data may include an unsupported feature that the simulator is unable to represent accurately, and the score may be determined based on the presence of the unsupported feature.

In some examples, a score may be based on whether the vehicle interacts with an object or feature of the environment, and/or whether a vehicle relies on an object or feature to make a determination of an action to perform. A perception component may be configured to gather and determine information about objects and features within the environment based on sensor data. A planning component may be configured to determine a course of action for the vehicle, such as a trajectory, based on at least some of the objects or features for which the perception component determined information. The planning component may provide planning data indicating on which objects or features it based its determination of a course of action. The planning data may form part of the log data. The planning data may be determined based on the log data and one or more objects may be identified from the planning data on which the vehicle relied to determine an action to be performed or to perform an action. Differences between objects or features with which the vehicle interacts and their representations in the simulation may have a greater impact on the outcome of the simulation than where a vehicle does not interact with the object or feature. Accordingly, such a difference may result in a lower confidence score.

In some examples, a score may be based on a distance of a feature or object from the vehicle that recorded the log data. A score for a feature may be adjusted based on its proximity such that objects or features that are further from the vehicle in the simulation have a lower score than those that are close to the vehicle. In some examples, a score may depend on whether the vehicle and object or feature are within a predetermined distance of one another during the simulation.

In some examples, a score may be based on what the object or feature is and how it is represented in the simulation. For example, locations or aspects of some features, such as trees or other environmental features, may be randomly generated. Environmental features such as trees may be randomly assigned because there is insufficient location data relating to the trees. In some examples, locations of trees may be known but aspects of the tree may be unknown, such as a number of branches or their height. Such features may be unknown because they are not included in map data and/or they are not determined by perception components. Capturing such details may not be possible using the sensors available on a vehicle and/or a decision may have been taken not to capture such information in log data. The presence of many randomly generated features such as trees may result in a decrease in the score. This may be because the simulator has a lower ability to represent the features in the real driving scenario in the simulation due to the random generation and/or the lack of data relating to those features.

In some examples, location data for particular objects of features may be lacking in log data and/or road network or map data. A score may be based on this lack or absence of location data, an example being the trees, poles for road signs and traffic lights, or other features on a sidewalk. In some examples, location data may be available for part of an object, such as a head of a traffic light, but how the head is connected to the ground via its pole may not be known. This may be because the data is not recorded in road network or map data. The pole configuration and location may not be included in log data, may be difficult to determine based on sensor data, or may be difficult to determine by the perception component.

A score may be based on whether the simulation was successfully executed. A simulation may be determined to be successfully executed where the simulated vehicle does not collide with a simulated object or the environment. A simulation may be determined to be successfully executed where the output from the simulated vehicle corresponds substantially to the output from the vehicle as recorded in the driving log.

A score may be determined based on a type of simulation or simulator being used and/or a purpose of the simulation. A simulation may be a two-dimensional or three-dimensional simulation. A two-dimensional simulation may include less detail and may be used to determine less complex results than a three-dimensional simulation. Accordingly, a score may be determined to reflect these differences. How a score is determined may be based on whether a two-dimensional simulation or a three-dimensional simulation is being generated. In examples, different simulations may model sensors to different degrees. For example, in some simulations sensor returns may not be modelled, whereas in others the sensors and their returns may be modelled. The sensors and their returns may be modelled simply or the sensors and their returns may be modelled in detail with full ray-tracing and other specific detail. A score may be dependent on the way data is determined from the simulation and whether and how the sensors are modelled.

In an example, in a real driving scenario, the vehicle may have driven a route that included a particular environmental feature, such as a tunnel. Tunnels may be an example of an environmental feature that a simulator may be unable to replicate. Instead, the simulator may represent the tunnel as closely as possible as a conventional road with walls on either side, i.e., a cut-through. Because of this difference between the simulation and the real driving scenario, a simulated vehicle in the simulation may act differently or determine different sensor data than the real vehicle did in the real driving scenario. A tunnel may influence how much light there is and therefore what data may be gathered. Accordingly, when a simulation is generated or a simulation is to be generated based on log data that includes a tunnel, a lower score may be assigned to the simulation than for a simulation without the tunnel. The lower score therefore indicates that the system's ability to replicate the real driving scenario as a simulation was lower than for other simulations with higher scores. Further examples are described below in relation to FIG. 1.

Assigning a score to a simulation enables comparison between simulations. The score may be considered to be a relative metric that indicates the quality of conversion of log data in different simulations. The scores may be presented to a user via a display to enable comparison by a user. Simulations may be ordered according to their scores to better enable comparison. Enabling comparison between simulations may be particularly useful where there are hundreds or thousands of simulations. The score may be compared to a threshold score to determine whether it is to be included in a dataset for training or validating a machine-learned model or to determine whether the simulation may be used to generate further simulations. For example, if the score is above a threshold, it may be determined that the simulation is an accurate representation of a real driving log. A score may be compared to a threshold to determine whether improvement may or should be performed for the simulation. A score below the threshold may result in the simulation being submitted or flagged for improvement by a user. Conversely, where a score is below a threshold, this may be useful for identifying where a simulator lacks a particular functionality, or even where an interesting or unusual event occurred. In some examples, updates to the simulator and its operation and/or to stored data such as stored models, map data, or road network data, may be made based on the score. Users may triage or otherwise analyze the simulations and scores. In some examples, a computing device may be configured to automatically perform such triaging to determine suitable simulations for particular uses, such as inclusion in datasets, for execution, or for use in generating further simulations. Simulations may subsequently be used to generate further simulations including particular examples of driving scenarios. Scores below a threshold may be used to determine unusual events or features, and may therefore allow quick identification of these unusual events or features and for further simulations to be generated to improve testing of one or more machine-learned models based on these unusual events or features.

The scores may be useful in determining patterns of deficiencies in log data. Specifically determining scores for specific features may enable log data and its conversion to be critically assessed with regard to that particular feature. In other words, a score for each specific feature of a plurality of features may be determined for each of a plurality of simulations. The scores may be averaged or otherwise analyzed to reflect whether a simulator is adequately converting the log data relating to that particular feature.

Without knowledge of how the system was able to recreate the log data in simulation, a user may receive results and other data from the simulations that are inaccurate but may not be able to tell that they are inaccurate. By providing such a score, a user, or an automated system, may be able to understand the context of the results and whether they are results that can be trusted as being accurate.

When generating a driving simulation based on driving log data, a simulator may attempt to represent each real object in the driving log data with a best-match validated model of a simulated object from a database of validated models. Validated models may have been generated by or with input from a designer and may be validated or verified as corresponding to a previous real-world object. Sometimes, the new real object may be obscure or bespoke and there may not be a corresponding model of a simulated object in the database of validated models. Other times, the new real object may not have been recognized by a perception system of the vehicle, and so may not have an associated classification or label to allow determination of a validated model corresponding to it. This may be because the vehicle does not have an appropriate classification or label. In these examples, it may be determined that the database of validated models does not include a model corresponding to the real object. It may be determined that the database of validated models lacks a model corresponding to the real object by choosing a best-match validated model and determining a difference between it and the real object. A best-match validated model may be chosen based on one or more parameters of the real object as indicated in the driving log data. A bounding box may be associated with the real object in the driving log data, and the best-match may be determined as a validated model having a bounding box and/or dimensions that most closely correspond to the bounding box associated with the real object. A classification or label may be associated with the real object and the best-match may be determined as a validated model having a classification or label that corresponds to that of the real object. In other examples, it may be determined that the database of validated models lacks a model corresponding to the real object by comparing the real object to the models and determining that none of the models meet set criteria for matching the real object. The database may be determined to lack an appropriate model if the object is associated with a classification or label that is not found in the database or that is too broad to enable determination of a specific model. In some examples, multiple different models may be determined for an object, and it may be determined on this basis that there is a lack of an appropriate model due to this. In examples, the database may be determined to lack an appropriate model if the object lacks a label or if the label was incorrectly applied or mismatched. A label may be identified as being incorrectly applied based on a system determining the label based on a best available label based on log data and a perception system, or may be identified by a user. In some examples, differences in bounding boxes or dimensions may be determined to determine a lack of an appropriate model or an incorrectly applied label.

Where a database of validated models lacks a validated model for the real object, one or more actions may be taken to create a usable simulation. One action may be to choose a best-match model to represent the real object in the simulation. A best-match validated model may be chosen, as described above or using another method. In some examples, the best-match may be chosen based on more criteria than a validated model would otherwise be chosen based on. For example, validated models may be determined based on a bounding box and classification when performing a conversion, but if it is determined that the database lacks a model corresponding to the real object, a best-match model may be determined based on actual dimensions of the real object based on sensor data in the driving log data. Generating the simulation with a best-match validated model may enable fast generation of a simulation and access to results.

An action that may be performed may be to generate a machine-generated model for the real object. The machine-generated model may be generated based on sensor data that corresponds to the real object in the driving log data. The sensor data may comprise visual or geometric data. Visual data may be received from one or more image sensors, such as cameras, on the vehicle. Geometric data may be received from a Lidar sensor. A mesh, surface, or envelope for the real object may be generated based on the sensor data and may be used as the machine-generated model. Generating a machine-generated model may result in a model of a simulated object that has at least dimensions that correspond to the dimensions of the real object. This may allow for the simulation to be performed relatively quickly to determine at least some outputs. For example, the simulation may be performed and simulated driving log data may be output from a machine-learned model for one or more simulated vehicle systems that rely on dimensional data of objects. For example, output from a simulated collision avoidance system may be gathered. In some examples, the machine-generated model may comprise a mesh such as a polygon mesh, a grid such as a voxel grid, a 2- or 3D surface, a 2- or 3D envelope. The machine-generated model may comprise or may be generated by extracting data from a network, such as a neural radiance field (NeRF). The machine-generated model may be stored in a database of machine-generated models so that it may be used subsequently. The machine-generated model may be stored with contextual data and/or data relating to the real object, so that it may be determined what the machine-generated model represents.

A machine-generated model may be useful for enabling at least some results to be gained from the simulation quickly. For a more accurate simulation, it may be desirable to generate a more accurate model for the real object. The more accurate model may be a new validated model. Accordingly, an action that may be performed in response to determining that a database of validated models lacks a suitable model for the real object may be to request creation of a model by a designer. This model may be referred to as a second model, to distinguish from the machine-generated, first model. For example, a request message may be generated and transmitted to a designer or to a system used by the designer. A request may comprise an entry, ticket, card, flag, or other indicator generated to indicate to a designer that a model is requested. For example, a ticket may be created in Jira or other project management software. The request may include data relating to the real object. For example, the request may include any data relating to the real object included in the driving log data. The data relating to the real object may include visual data such as images of the real object. The request may include a machine-generated model generated for the real object. The request may include data determined by the simulator based on the data in the driving log. In examples, a machine-generated model may become a validated model if found to be accurate for intended simulation purposes (e.g., by being validated by a designer and/or through automated or parameter driven evaluation).

A designer may create a new model manually or using automated model generation tools. A model may be generated based on a machine-generated model and/or a best-match model from the database of validated models. The model may be generated by modifying the machine-generated model or the best-match model based at least in part on driving log data. The model may be generated from scratch. The model may be based on geometric data from the driving log data. A point cloud may be determined based on such geometric data, typically from a LiDAR sensor. A mesh, surface, or envelope may be generated based on the geometric data. Features of the real object may be overlaid on the mesh, surface, or envelope. Features of the real object may include material, texture, color, or transparency. Such features may be determined based on visual data and/or other driving log data such as infrared data, hyperspectral data, or radar data.

The new model may be validated by the designer, and may therefore be referred to as a new user-validated model. The new user-validated model may be provided to the simulator for use in a driving simulation based on the driving log data. The validation of the model may indicate that it directly corresponds to the real object. The model may be stored in the database of validated models for subsequent use in simulations, in case the real object is identified in other driving log data. In some examples, once a model is generated for a real object in this way, a process may be performed to identify other simulations requiring a model for the same real object. This may be determined based on scores of the simulations, based on data associated with the simulations, or based on the driving log data. A selection of simulations may be updated or generated to include the model.

In some examples, the updated model may be based on a neural radiance field corresponding to an object. For example, in response to identifying that a database does not have a matching model for the real object, a neural radiance field may be generated based on visual and/or geometric sensor data. A request may subsequently be submitted for providing a new model including the neural radiance field. A user may extract data from the neural radiance field to determine data for generating the new model. In some examples, a user may respond to the request by validating the machine-generated model and/or may make adjustments to the model and subsequently validate it. The simulation may be executed and/or included in a dataset once the model is validated.

In generating a simulation and taking one or more actions, a score, such as those described above, may be generated. The models themselves may be associated with particular scores that contribute to an overall simulation score. The score may be dependent on the action that was taken. For example, a user-validated model may have a higher score than a machine-generated model. A machine-generated model may be associated with a score that is lower than a best-match, validated model because a simulation including a machine-generated model may be less useful than a simulation including a best-match validated model. A score may be generated for a simulation including a machine-generated model and then updated or replaced based on a new simulation including a new, user-validated model.

By taking an action to include a machine-generated model or a new user-validated model, simulations may be generated and performed to balance time considerations against accuracy. In some scenarios, it may be useful to have at least some results from a driving simulation available to determine a usefulness of the driving simulation. Accordingly, a machine-generated model may be used to initially provide some results, before a user-validated model is available. Once the user-validated model is available, it can subsequently be used to generate a simulation that better represents the driving log data and can therefore provide more realistic results.

The above techniques include the generation of a score to enable comparison of simulations and how the system was able to represent driving log data in those simulations, as well as the use of machine-generated models in simulations in advance of receiving a user-validated model to provide faster results. These techniques may enable faster analysis of simulations to determine their usefulness. The techniques may enable datasets for machine-learning to be generated more quickly and efficiently, and may result in those datasets including data for testing and/or validation that is of a higher quality. As a result, the training of a machine-learned model for use in autonomous vehicles may be improved, which may result in safer operation of those vehicles.

Turning now to the accompanying figures, in FIG. 1, a real-world driving scenario 100 is shown. A vehicle 102 is depicted travelling on a road 104. The vehicle 102 is depicted in FIG. 1 as an autonomous vehicle, but in other examples may be a semi-autonomous vehicle or a manual vehicle. The vehicle 102 may be a test vehicle.

The vehicle 102 may include includes one or more sensors 106, which are part of a wider vehicle system 108. The sensors 106 can gather sensor data relating to the real-world driving scenario 100, and particularly in relation to the vehicle 102, the environment in which the vehicle 102 is travelling, and objects in the environment. If other objects such as vehicles, pedestrians, street furniture, street markings, or static vehicles are present in the vicinity of the vehicle, the sensors 106 may gather data in relation to these features. In some instances, the sensor 106 may include LiDAR sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensors 106 may include multiple instances of each of these or other types of sensors. For instance, the radar sensors may include individual radar sensors located at the corners, front, back, sides, and/or top of the vehicle 102. As another example, the cameras may include multiple cameras disposed at various locations about the exterior and/or interior of the vehicle 102. Example sensors are also described below in relation to FIG. 7.

The vehicle system 108 may also include a perception component 110, a localization component 112, and a driving log database 114. The specific systems shown within vehicle system 108 in FIG. 1 are provided for the purpose of explaining FIG. 1 and may form only a part of a wider vehicle system, an example of which is described later in relation to FIG. 7. The vehicle 102 may comprise any systems appropriate to enable its autonomous or semi-autonomous control.

The perception component 110 may be configured to generate perception data based on the sensor data recorded by the sensors 106. The perception component may detect object(s) in in the environment surrounding the vehicle 102 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like, and may output perception data associated with the same.

The localization component 112 may be configured to generate localization data based on sensor data from the sensors 106. The localization component 112 may include hardware and/or software to receive data from the sensors 106 to determine localization data, which may include a position, velocity, and/or orientation of the vehicle 102 (e.g., one or more of an x-, y-, z-position, roll, pitch, or yaw). The localization component 112 may receive data relating to one or more maps in order to determine position, velocity, and/or orientation of the vehicle 102. In some examples, the localization component 112 may be configured to provide data to the perception component 110. The one or more maps may represent the environment in which the vehicle 102 is driving. The one or more maps may represent an environment in which the vehicle 102 is permitted to drive. The one or more maps may comprise maps relating to different characteristics of the environment. The one or more maps may include a road network map.

In some examples, a prediction component may be provided, which is configured to generate prediction data based on sensor data. A planning component may be provided, which is configured to generate planning data based on sensor data. Sensor data and data from components of the vehicle system may be provided to other components to generate further analysis data.

The sensors 106, perception component 110, and localization component 112 may be configured to output data for use as part of a driving log for the journey or part of a journey on which the vehicle 102 is embarked. The driving log may be stored in a driving log database 114. The driving log database 114 may be stored in memory (not shown) of the vehicle 102. The driving log database 114 may comprise a plurality of driving logs generated by the vehicle 102.

The vehicle 102 may travel along the road 104 following a trajectory or route. The trajectory or route may be determined based on a destination location as well as the maps 114 and data gathered and determined by the sensors 106, perception component 110, and localization component 112. Along the route, the vehicle 102 may encounter and/or interact with real objects and environmental features. In the scenario 100 of FIG. 1, a couch 116, which is an example of a real object, is depicted as having been left on the road 104, in the path of the vehicle 102. The scenario 100 also includes an example of an environmental feature in the form of a tunnel 118 further along the road from the vehicle 102. A further real object, a pickup 120 with an unusual cargo comprising chopped wood, is depicted entering the tunnel 118 ahead of the vehicle 102. A steam grate 122 is emitting a cloud of steam 124 next to and across the road 104, such that the steam 124 occludes part of the road 104.

The systems 108 of the vehicle 102 may gather data relating to the couch 116, pickup 120, steam 124, and tunnel 118, as well as other features or objects in the environment. Data relating to these features may be gathered by the sensors 106 and may comprise visual and geometric data, such as may be gathered from a LiDAR sensor, radar sensor, image sensor, and/or time-of-flight sensor. The perception component 110 may be configured to determine, based on the data gathered by the sensors 106 that the couch 116 is a couch. The perception component 110 may assign a bounding box to the couch 116 and may assign a classification. An identifier and/or one or more attributes of the couch 116 may also be determined by the perception component 110. In other examples, the perception component 110 may be unable to identify the couch 116 as it may lack the ability to recognize couches. Instead, it may determine that the couch 116 is an object, and attempt to assign a classifier to it based on a best match object from a database of known objects. The location of the couch 116 in the environment, as well as its location relative to the vehicle 102 may be determined by the localization component 112. For example, the localization component 112 may generate data indicating a map and a location within that map.

Similarly, data relating to the tunnel 118 may be determined by the sensors 106 and perception component 110, and may also be determined by the localization component 112. For example, as the vehicle 102 drives towards and through the tunnel 118, the localization component 112 may record that the vehicle 102 travelled along a route that went through the tunnel 118.

Data relating to the pickup 120 may be determined by the one or more sensors 106 and perception component 110. The perception component 110 may be unable to identify the pickup as a pickup due to its unusual cargo. For example, the cargo may increase a length of the pickup 120, which may cause the perception component 110 to perceive the pickup 120 itself to be longer than it actually is. Instead, therefore, the perception component 110 may classify the pickup 120 as a truck or another object having similar dimensions.

Data relating to the steam 124 may be determined by the one or more sensors 106 and perception component 110. The perception component 110 may be able to identify the steam 124 and may assign a bounding box to the steam 124. However, due to the transience of the steam, the bounding box may shift as the steam shifts, causing the location of the steam to be noisy in the log data. In some examples, the perception component 110 may be able to identify the steam 124 but may be unable to associate it with a location within the environment due to it lacking solidity. The steam 124 may be identified as obscuring a line of vision of the vehicle 102.

The vehicle 102 may be controlled by its systems 108 to react appropriately to objects, features, and situations it encounters as it continues its journey. The vehicle system 108 may determine data relating to how the vehicle 102 is to be controlled and/or how the vehicle 102 reacts to particular objects and features.

The data relating to these features in scenario 100 may be recorded in a driving log for the journey being executed by the vehicle 102. Data relating to the actions of the vehicle 102 in response to the features may also be recorded in the driving log. For example, it may be recorded in the driving log that the vehicle 102 navigated around the couch 116. The driving log may be stored as driving log data in the driving log database 116.

Driving log data 126 from the driving log database 116 may be provided to a remote computing device(s) 128. While shown in FIG. 1 as being sent directly from the driving log database 128, the driving log data 126 may be provided to the remote computing device(s) 128 in any suitable way. In examples, the driving log data 126 for a journey may be provided as a packet of data sent from the driving log database 116 once the vehicle 102 has completed the journey (i.e., stopped at a predetermined location or stopped for a predetermined amount of time). In other examples, driving log data from multiple different journeys may be sent to the remote computing device(s) 128 at a convenient time. For example, the vehicle 102 may send the data to the remote computing device(s) 128 periodically, such as at a predetermined time each day or each week. In other examples, the vehicle may stream the data to the remote computing device(s) 128 in real time, which may compile and store the data in memory. In some examples, the remote computing device(s) 128 may be configured to query the vehicle 102 or another computing device at which driving log data 126 is stored to retrieve the data.

The computing device 128 may include a simulator 130. The computing device 128 may be arranged to provide the driving log data 126 it receives from the vehicle 102 to the simulator 130. The simulator 130, and/or another processor, module, or system within the computing device 128 may be configured to convert the driving log data 126 into a driving simulation. An example driving simulation 132 is depicted in FIG. 1. The simulation 132 includes a simulated vehicle 134 travelling on a simulated road 136. The simulated vehicle 134 corresponds to the real vehicle 102 and the simulated road 136 corresponds to the real road 104.

Driving log data 126 may be converted into a simulation, such as simulation 132, by determining and rendering an environment that the vehicle 102 traversed. The environment may be determined based on localization data, and trajectory and/or route data from the driving log data 126. Driving log data 126 may include perception data, planning data, localization data, references to map data, trajectory and/or route data, vehicle state data.

A simulated environment corresponding to the route traversed by the vehicle 102 may be generated for the simulation 132. The simulated environment may comprise a plurality of tiles, where each tile represents a portion of the environment. Tiles may be stored in a tile database and selected based on the route. A tile may be selected if the vehicle 102 entered the portion of the environment represented by the tile when travelling along the route, and/or was within a predetermined distance of that portion. The tiles may be arranged to build a simulated environment. Each tile may include a simulated road, and any data associated therewith, which may have been determined based on one or more maps and/or a road network. Each tile may include data relating to junctions and/or features of the road. Each tile may include data relating to buildings and/or other architectural features. Tiles may include static features such as traffic lights. A simulated environment may be a two-dimensional (2D) or three-dimensional (3D) simulated environment.

Real objects identified or indicated within the driving log data 126 may be converted to simulated objects for use in the simulation. Models of the simulated objects may be retrieved from a database of validated models and placed in the environment. Where the objects are other vehicles and/or pedestrians, trajectories of these objects may be determined and simulated based on the driving log data.

In some circumstances, a feature or object may be present in the driving log data that the device 128 or simulator 130 is unable to represent in a simulation or that can only be represented in the simulation in a limited way. In other examples, a feature or object may be present that, while represented accurately in the simulation, causes a response from a simulated vehicle that is unrealistic. For example, in some examples, a particular type of road junction may be traversed by the vehicle in a real driving scenario. The type of road junction may cause problems when incorporated into a simulation. In another example, an architectural feature may be difficult to represent in simulation, such as when roads cross one another at different vertical heights, which may happen where a bridge, overpass, underpass, tunnel, or flyover are present in the real environment. Instead of representing the architectural feature, a compromise may be utilized in the simulation, such as a crossroads rather than a road passing overhead. This may be referred to as the architectural feature being unsupported by the simulation or the simulator.

In the simulation 132, some examples of this are shown. In simulation 132, the tunnel 118 is an unsupported architectural feature, meaning that it has not been represented as a tunnel in the simulation 132, but instead is represented by a walled cut-through 138. The simulator 130 may be unable to represent the couch 116 in the simulation 132 because there is not a corresponding couch model in a database of validated models. Instead, the simulation 132 may include a box 140 representing the couch 116. The box 140 may be a best-match model from the database or a representation used for objects for which an equivalent cannot be found. In other examples, as described below in relation to FIGS. 5 to 7, a machine-generated model may be used to represent the couch 116 where a database of validated models lacks a corresponding model.

In simulation 132, the vehicle system 108 may have been unable to recognize the pickup 120 as a pickup and may have instead labelled it incorrectly as a truck. As a result, the simulator 130 may have chosen a model of a truck 142 to represent the pickup 120. However, a height and length of the truck 142 may differ from those of the pickup 120 as recorded in the driving log, and such a difference may be identified when attempting to represent the pickup 120 in the simulation.

The steam 124 may not be represented in the simulation 132 or may be represented as an undefined region 144. This may be due to an absence of data for the object in the driving log data 126 to enable the steam 124 to be rendered fully as a simulated object in the simulation 132. Alternatively, the simulator 130 may be unable to render steam.

As a result of the conversion of the driving log data 126 relating to the scenario 100 into a simulation 132, the simulation may be less accurate than a simulation for a scenario 100 that does not include a tunnel 118, a couch 116, a pickup 120, or a cloud of steam 124. In order to quantify this relative accuracy, and to indicate how well the conversion from the driving log data was able to be made by the computing device 128, simulator 130, or other system responsible for generating the simulation 132, a confidence score 148 may be determined and output. The confidence score 148 may be output as well as results 146 of the simulation 132, which may include simulated driving log data 146, as a result of the simulator 130 executing the simulation. One or more other metrics and/or results may also be output from the simulator 130 based on executing the driving simulation 132. The simulation itself, represented in FIG. 1 as simulation data 144, may also be output. Simulation data 144 may comprise an identifier for the simulation 132. Simulation data 144 may comprise an identifier for the driving log used to generate the simulation 132.

In some examples, only the simulation data 144 and the confidence score 148 may be output. Execution of the simulation 132 may be performed later to determine the simulation results 146. The simulation data 144 may be stored in a database including a plurality of simulations (not shown), for later use. The simulation data 144 may be stored together with the confidence score 148. Alternatively, or additionally, the confidence score 148 may be stored with an indication of the simulation 132 or a pointer to where the simulation data 144 is stored.

A confidence score 148 may indicate an ability of a system or device generating the simulation to convert the driving log data to a simulation. The confidence score 148 may refer to the simulation as a whole or may be specific to one or more converted features of the simulation. More detail in relation to confidence score determination is described below in relation to FIGS. 3 and 4.

The confidence score 148, simulation data 144, and, optionally, the simulation results 146 may be output to a processor 152. The processor 152 may be configured to analyze the simulation data 144, simulation results 146 and/or the confidence score 148. In some examples, the processor 152 may be configured to analyze simulated driving log data and confidence scores from a plurality of different simulations. In some embodiments, the processor 152 may determine the confidence score 148 based on simulation data 144 and/or simulation results 146.

The processor 152 may generate an ordered list of simulations according to their confidence scores. Such an ordered list may be made available to a user via a display 154. The user may use an ordered or unordered list of simulations and their associated confidence scores to determine how to use the simulations.

The processor 152 may be configured to store the simulation data 144 and/or the simulation 132 in a training and/or validation database 156, based on the confidence score 148. The confidence score 148 may be compared to a threshold by the processor 152 and if it exceeds the threshold then it may be stored in the database 156. Simulations stored in the database 156 may be used to train a machine-learned model 158. The machine-learned model 158 may be an autonomous driving model for use on an autonomous vehicle. The processor 152 may be configured to store simulations in the database 156 based on a request from a user in response to displaying the confidence score 148 on the display 154.

The processor 152 may be configured to determine one or more updates 160 to the simulator 130, a system configured to perform conversion of driving log data 126 to a simulation, and/or the simulation 132 based on the confidence score 148. For example, as will be described below in relation to FIGS. 5 to 7, a machine-generated model may be created and used to replace one or more models of simulated objects within the simulation 132 to provide a simulation that better represents the scenario 100.

The process of FIG. 1 may be summarized as flow chart, such as the flow chart 200 of FIG. 2. The method 200 may be performed at one or more computing devices, such as computing device 128. The computing device 128 may comprise one or more processors configured to perform the method 200, and may store instructions in memory that, when executed on the one or more processors, cause the method 200 to be performed by the computing device 128.

The method 200 may comprise, at step 202, receiving a driving log 202. The driving log may be parsed or otherwise accessed or reviewed to determine, at step 204, log data. The log data, such as log data 126, may be received from a vehicle, such as the vehicle 102, and may relate to a real driving scenario, such as scenario 100. In some examples, the driving log may be a simulated driving log generated by a simulated vehicle and may therefore comprise simulated log data representing a simulated driving scenario. Simulated driving logs may be useful in the context of the inventions described herein to provide more data for testing the simulator 130. The log data may be received from a repository at which log data for multiple scenarios is stored. A processor implementing the method 200 may access the repository to retrieve the log data. The repository may comprise stored log data from a plurality of different vehicles. Vehicles, once a journey is complete, may send data to the repository for storage. The repository may be in cloud storage. The log data, as described above, may relate to a real environment and may identify one or more real objects within the environment.

At step 206, at least one feature may be determined from the log data. The at least one feature, as indicated above, may be an object or a feature of the environment, or, in some examples, a cloud or other particulate matter.

At step 208, a driving simulation may be generated based at least in part on the log data determined in step 204. The driving simulation may be generated by converting the log data. Converting the log data may include determining a simulated environment corresponding to the environment indicated in the log data and in which the driving scenario took place. The conversion may include determining one or more simulated objects or models thereof corresponding to real objects identified in the log data. The simulated environment may be generated based on stored map data and/or road network data. The map data and/or road network data for the simulated environment may be determined based on localization data in the driving log data. A model of a simulated object may be retrieved from a database and positioned within the simulated environment. A simulated trajectory may be associated with a model, which may be caused to move along the simulated trajectory. As the simulation is a recreation of the real driving scenario, it may be referred to as a playback simulation. Some aspects of the simulation may be automatically generated. For example, trees and their placement may be generated randomly based on one or more predefined parameters.

At step 210, the driving simulation may be executed, and at step 212 data relating to the driving simulation may be determined, as a result of or based on executing the driving simulation. Steps 210 and 212 are optional steps in the method 200. In some examples, the driving simulation may not be executed 210 until later. The data relating to the driving simulation may include simulated driving log data. The method 200 may comprise, in step 214, determining a value for the driving simulation. The value may indicate an ability of the system to represent at least one feature of the real driving scenario in the driving simulation. The value may be a value for a metric. The value may correspond to a score such as confidence score 148. The value may be based on the generation and/or the execution of the driving simulation. In some examples, the driving simulation may be executed 210 after a value is determined in step 214. In some examples, the driving simulation may be executed 210 based on the value determined in step 214. Examples of determining the value are described in relation to FIGS. 3 and 4.

At step 216, the data relating to the driving simulation and the value may be output. As described above, the value may be displayed and/or compared to a threshold to determine an action to be taken.

Figure 3:
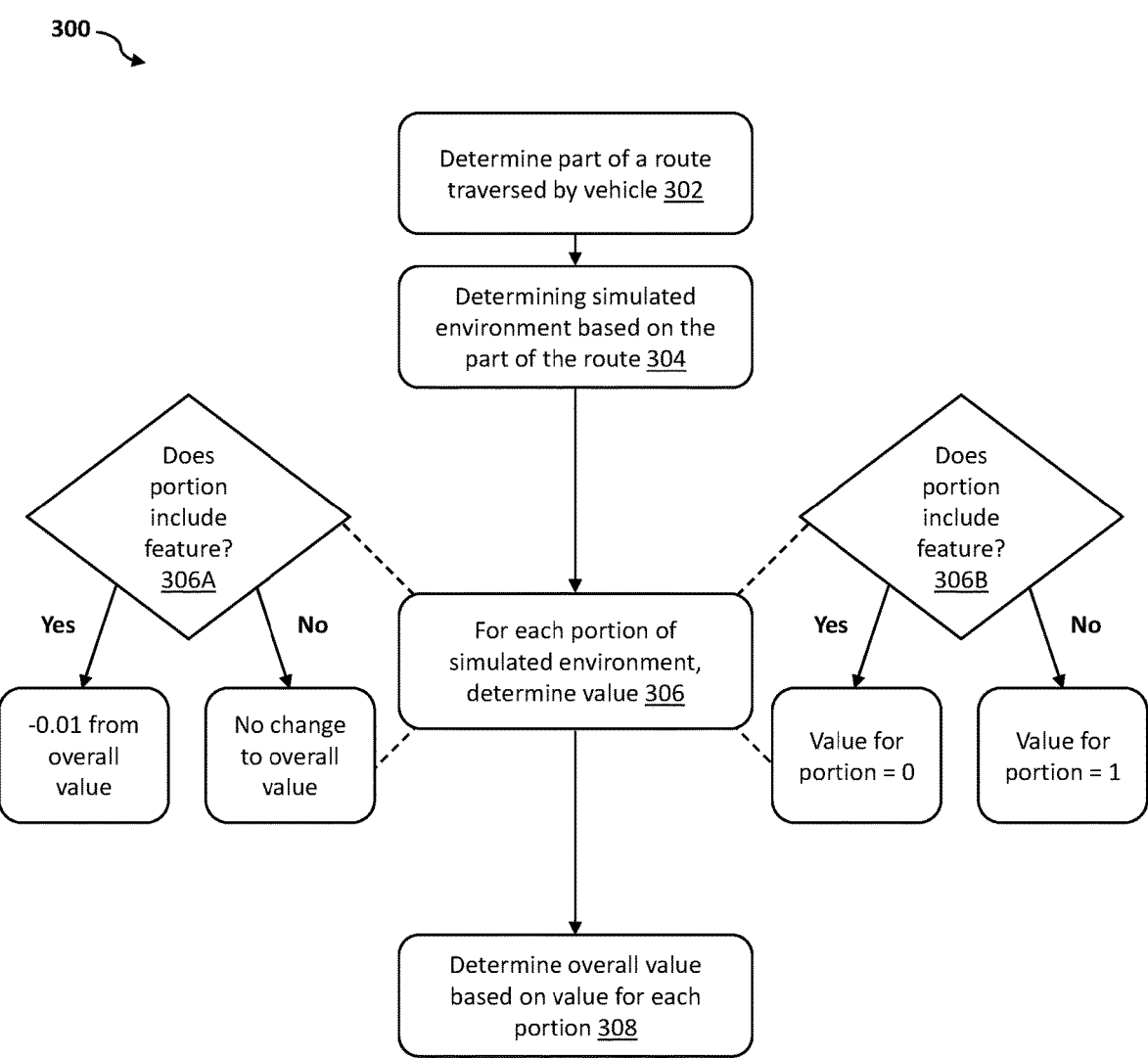
FIG. 3 depicts a first example of determining a value indicating an ability of a system to represent a feature in simulation according to the present invention.

FIG. 3 shows an example process for determining a value indicating the ability of a system to represent at least one feature of a real driving scenario in a driving simulation. In FIG. 3, the value is based on whether the simulation includes a specific architectural feature such as a tunnel. The presence of the architectural feature affects the resulting value.

In the process 300 of FIG. 3, a route or a part of a route traversed by the real vehicle may be determined at step 302 based on log data. The route may be indicated in localization data in the log data. A route may comprise a plurality of trajectories taken by the vehicle. The localization data may refer to coordinates, map references, road network segments, and/or other data to enable the route to be recorded and determined. The route may also include timing references and data associated with how the vehicle drove along the route. The route may include trajectory data.

At step 304, a simulated environment corresponding to the route or the part of the route may be determined based on the log data. The route may be compared to map data, road network data, or other environmental data stored by or accessible to a computing device or system performing the conversion of the log data to the simulation to identify the environment through which the vehicle drove. The environment may be partitioned into a plurality of portions, tiles, or segments for which corresponding simulated environment portions exist. Portions of simulated environment corresponding to the route may be determined and used to construct a simulated environment for the driving simulation.

At step 306, for each portion of the simulated environment, it may be determined whether a particular architectural feature is present. Each portion may have associated data or metadata that indicates features present in that portion. Said data may be accessed and parsed to determine whether the feature is present. The data may indicate that the system has limited or no capability to represent the feature in a simulation.

Two examples of determining an associated value are shown in FIG. 3. On the right of step 306, step 306A illustrates how the inclusion of the feature may be used to adjust an overall value. In this example, an initial overall value of 1 may be assigned. Each time a specific feature is present, an adjustment may be made to the value. In this example, a value of 0.01 is removed from the overall value each time the feature is present in a portion of the environment, whereas no change is made if the portion is not found. On the left of step 306, step 306B assigns a specific value for each portion. In this example, a value of 0 is assigned to the portion if the feature is present, and a value of 1 is assigned to the portion if the feature is not present. Generally, the value may be related to what the object is or a broader class or type of object, the type of simulator being used, a type of simulation being generated, a purpose of the simulation (i.e. what it is intended to test), a distance of the object or feature from the vehicle, whether the object is used to base a decision on during the driving scenario, based on planner data, whether a model is available for representing the object, or whether the simulator has a known difficulty in representing the object.

At step 308, an overall value for the simulation, or at least the simulated environment, may be determined based on the value determined in step 306 for each portion. Where a plurality of features are under consideration rather than a single architectural feature, the processes followed for step 306 may include a combination of steps 306A and 306B, whereby different features may affect specific scores for the portions and/or scores for features may be combined into an overall score for the portion. In some examples, the value for each portion may be subjected to a multiplier or weighting based on one or more criteria. For example, if the vehicle passes through the portion, a first weighting may be used whereas if the vehicle only passes close to the portion, a second weighting may be used. Alternatively, a weighting may be proportional to or otherwise based on an amount of time the vehicle is in the portion of the simulated environment.

FIG. 4 shows another example process 400 for determining a value indicating the ability of a system to represent at least one feature of a real driving scenario in a driving simulation. In FIG. 4, the value is based on the conversion of an object to a simulated object. How the object is represented as a simulated object affects the resulting value.

In FIG. 4, at step 402, each object is determined from the log data. The objects may be determined sequentially, based on each portion of the environment, or may be determined from the log data at the same time.

For each object, at step 404 the object is attempted to be converted to a simulated object. A model may be determined from a database of validated models. Where a match is found in the database of validated models, a value may be determined based on the match at step 406. In some examples, a match for a model may not affect an overall value for the simulation. In some examples, a match may mean that the model and therefore the object is assigned a value of 1.

In some examples, the database may lack a suitable model. Instead, a best-match model may be determined from the database at step 408. The best-match model may be determined based on one or more characteristics of or associated with the real object. For example, a bounding box and one or more classifications of the real object may be determined. The classifications may be used to filter the models in the database. A model may be selected having a smallest difference between its bounding box and the bounding box for the real object.

A value may be assigned based on a best-match model being used at step 410. A best-match model may not correspond to the real object, and therefore may be assigned a lower value or may affect the overall value more than where a value for a match is determined as in step 406. The value assigned where a model does not exactly correspond to the real object may be fixed regardless of how the model differs from the real object. Alternatively, the value may vary depending on how the model differs from the real object. For example, the value may be dependent on one or more differences between the model and the real object such as a difference in one or more dimensions of the object and model and/or of a bounding box associated with the object and model, a difference in materials, a difference in textures, a difference in classifications, a difference in shape, or a difference in one or more other attributes. The value may be proportional or otherwise based on a number of or a scale of the differences between the real and simulated objects.

Alternatively, or additionally, where the database lacks a validated model in the database, a new model may be obtained, as at step 412. A new model may be obtained according to a process as defined in relation to FIGS. 5 and 6, as will be described below.

The new model may be a machine-generated model. A machine-generated model may be generated based on geometric and/or visual data. A machine-generated model may match the dimensions of the real object. A machine-generated model may lack one or more attributes of the real object, due to the limitations of machine generation. Accordingly, at step 414, where a value is assigned based on the new model, a lower value may be assigned to a machine-generated model than a matching model and/or a best match. The value may depend on which attributes are lacking.

Although not indicated in FIG. 4, the value may also be based on one or more other parameters. For example, a weighting may be applied to a value dependent on a location of the object relative to the vehicle that gathered the log data. An object that is further away may be of less importance, and may have less impact on the usefulness of the simulation, and therefore, where a model is machine-generated for that object, a value for that object may be adjusted to reflect the lower importance for that model. An object with which the vehicle interacts directly and for which a machine-generated model is obtained may be given a lower score than an object that the vehicle does not interact directly with.

A new model may comprise a designer-created model. Upon identifying that no match is available, a new model may be requested from a designer. A designer may be provided with a machine-generated model and/or sensor data and perception data relating to the object, and may build or create a new model for a simulated object by applying materials, texture, color etc to a mesh, surface, or envelope having the dimensions of the object. A designer-created model may be assigned a similar value to a matching model from the database because it can be considered to have been validated by a user of the system.

A machine-generated model and a designer-created model may both be obtained as part of step 412, with the machine-generated model being initially used in the simulation and the designer-created model being used subsequently.

In FIG. 4, based on the values for each model, at step 416, an overall value for the simulation may be determined. Overall values such as those described in FIG. 3 and FIG. 4 may comprise an average value, a weighted value, or a maximum or minimum value based on a plurality of contributory values for individual aspects of the simulation.

FIGS. 3 and 4 relate to values determined based on environmental features and objects. In some examples, a value may be based on a correspondence between a trajectory or route taken by the vehicle and/or one or more objects and a representative trajectory or route generated in a simulation. Examples of how such a value may be determined are described in U.S. patent application Ser. No. 17/745,269 titled "Improving Route Generation for Smart Objects in Driving Simulations", which is incorporated by reference in its entirety herein for all purposes.

Figure 5:
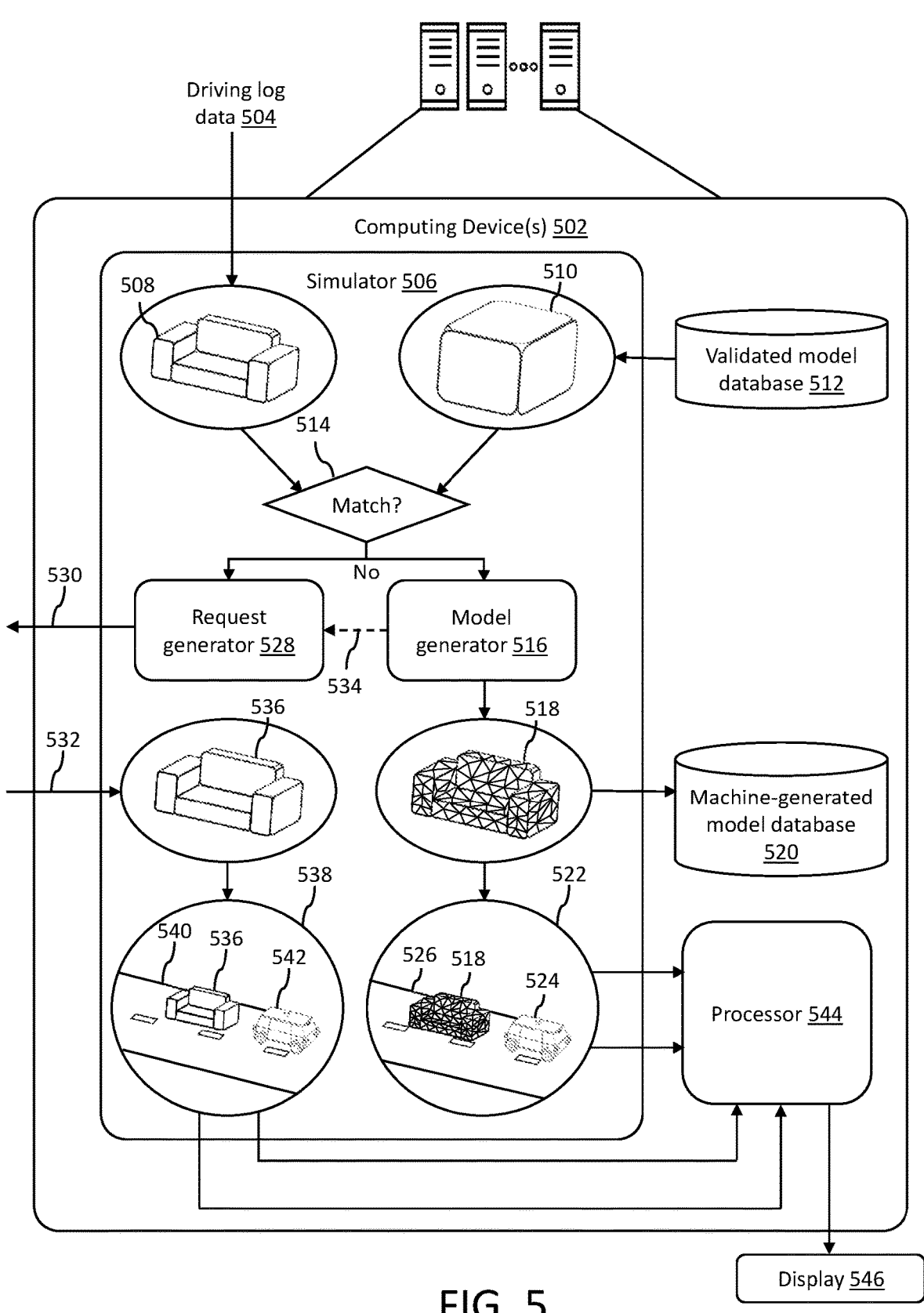
FIG. 5 is a pictorial diagram of a process for automated agent reconstruction according to the present invention.
Figure 6:
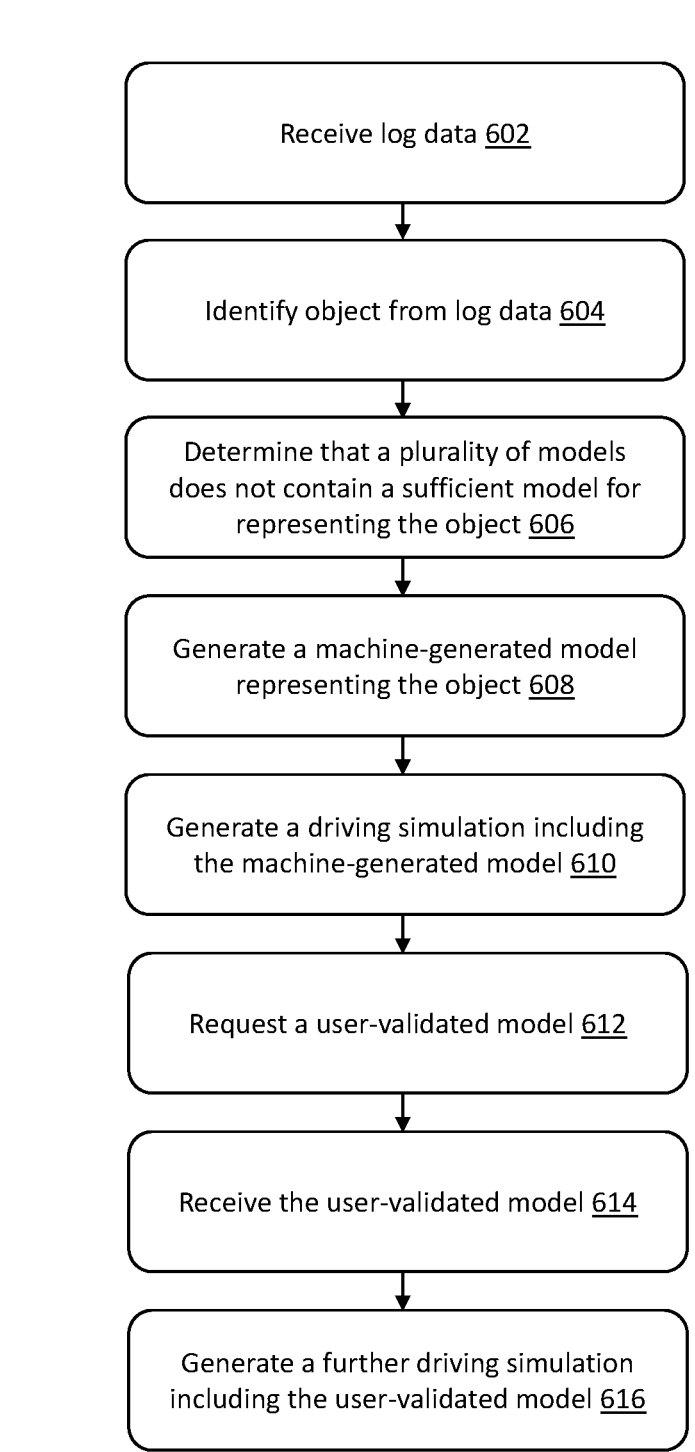
FIG. 6 depicts a flow chart of a process for determining log conversion confidence according to the present invention.

Turning now to FIGS. 5 and 6, FIG. 5 describes how a computing system 502 may be configured to generate machine-generated models and to request the creation of validated models from a designer. The computing device 502 may correspond to the computing device 128 of FIG. 1, or may be a different computing device. The process described in FIG. 5 Initially, driving log data 504, which may correspond to driving log data 126 of FIG. 1, is received or accessed by the computing device 502. The driving log data 504 may be converted to a simulation by the computing device 502. This process may be performed by a simulator 506, as shown in FIG. 5, or by another system within the computing device 502.

As in FIG. 1, the driving log data 504 includes a couch 508. Driving log data for the couch 508 may be compared to models such as model 510 that is part of a database comprising validated models of simulated objects 512. In some examples, the database 512 may lack a sufficient model for representing the couch 508. The model 510, which comprises a box of similar dimensions to the couch 508, may represent a best match for the couch 508.

As shown in box 514, the simulator 506 may determine whether there is a matching model in the database 512 corresponding to the couch 508. In FIG. 5, the outcome is 'No' because the box 510, which may be the best match, does not match the couch 508. In some examples, as shown in FIG. 1, the box 510 may be used in a first simulation, to enable a simulation to be performed and results to be output. In FIG. 5, while a simulation may still be generated using the box 510, instead, one or more new models for the couch 508 are obtained for generated further simulations.

As shown in FIG. 5, in a first branch, a model generator 516 may be used to generate a machine-generated model 518 corresponding to the couch 508. The machine-generated model 518 in FIG. 5 comprises a polygon mesh. Alternatively, the machine-generated model may comprise a voxel grid or other surface. The machine-generated model may be based on data extracted from a neural radiance field (NeRF). The machine-generated model may be generated based on a point cloud for the object determined using LiDAR sensor data. The machine-generated model may comprise, be generated based on, or encoded as a NeRF, a point cloud, a signed distance function, or a sparse octree. The machine-generated model may comprise or be based on a computer graphics rendering or encoding.

The machine-generated model may be stored in a machine-generated model database 520, and may be used to generate a simulation 522. The simulation 522 may include the machine-generated model 518, a simulated vehicle 524, a simulated road 526, and any additional simulated objects and/or simulated environmental features.

Simultaneously with or subsequently to generating a machine generated model, a request generator 528 may be operated to generate a request 530. The request 530 may be a request for a designer to create a validated model of the couch 508. The request 530 may include data relating to the couch 508 obtained from the driving log data 504. The request 530 may include the machine-generated model 518 and/or the best match validated model 510, as indicated by the arrow 534.

The request 530 may be sent to project management software such as Jira, where a ticket may be created. A designer may pick up the ticket and create a new model based on the driving log data. The designer may create a mesh or use the existing mesh from the machine-generated model to create a validated model of the couch. The designer may obtain data relating to material, shape, texture, dimensions, and/or other attributes of the couch from the driving log data and apply those attributes to the mesh to create a validated model. The designer may return the validated model to the simulator 506, as at 532. The validated model 536 may be stored in the database of validated models 512, for future use. The validated model 536 may be used to generate a yet further simulation 538, which may include the simulated vehicle 542 and a simulated road 540. The simulator may be configured to determine one or more other driving logs that may include the couch 508 and to use the validated model 536 to generate simulations for those driving logs.

the simulations 522, 538 and, optionally, results output from executing the simulations 522, 538, may be provided to a processor 544 for analysis. A value may be determined for each simulation 522, 538 indicating an ability of the simulator 506 or computing device 502 to represent the driving log in each respective simulation 522, 538. The value may be based on the machine-generated model 518 for simulation 522 and on the new validated model 536 for the simulation 538. The processor 544 may present the results and/or values to a user via a display 546. The processor 544 may be configured to provide one or both of the simulations 522, 538 to a dataset for training, testing, and/or validating a machine-learned model.

The process of FIG. 5 may be summarized as flow chart, such as the flow chart 600 of FIG. 6. The method 600 may be performed at one or more computing devices, such as computing device 502. The computing device 502 may comprise one or more processors configured to perform the method 600, and may store instructions in memory that, when executed on the one or more processors, cause the method 600 to be performed by the computing device 502.

FIG. 6 includes, at step 602, receiving log data and, at step 604 identifying an object in an environment from the log data. Based on the object and the log data associated therewith, it may be determined in step 606 that a plurality of models, such as those in a database of validated models does not contain a sufficient model for representing the object in a driving simulation. Said determination may be made by comparison of log data relating to the object with the database of models. The log data may indicate a classifier or label of the object. The classifier or label may be compared to corresponding classifiers or labels associated with the plurality of models. If an exact match is not present, then it may be determined that the database lacks a sufficient model. In some examples, the classifier or label may be too general to define a single corresponding model, and based on this it may be determined that the database lacks a sufficient model. In some examples, the log data may include a bounding box for the object. The bounding box may be compared to bounding boxes for the plurality of models. The database may be determined to lack a sufficient model if the bounding box of the object from the log data does not exactly match a bounding box for a model of the plurality of models. Alternatively, the database may be determined to lack a sufficient model if a bounding box of the object differs by more than a threshold amount from bounding boxes of the plurality of models. The database may be determined to lack a sufficient model if an object is identified in the log data but it was not assigned a label or classifier or bounding box by a perception system.

At step 608, a new model may be generated for use in a driving simulation. The new model may be a machine-generated model. At step 610, a driving simulation may be generated to include the machine-generated model. The driving simulation may be executed. A user-validated model may be requested and received, at steps 612 and 614, and a further driving simulation may subsequently be generated including the user-validated model at step 616. In examples, a generic user-validated model may be determined for a broad class of objects. The generic user-validated model may be generated based on identifying that the broad class of objects lacks a sufficient number of models in the database. For example, a new brand of car or other vehicle may lack models, and so a user-validated model may be generated for each make of car of the new brand. The generic model may be able to be adapted by a designer or a user to provide a better model, dependent on the situation. The generic model may comprise a plurality of optional plug-and-play components, such that, based on an analysis of the features of the object the components may be added nor varied as desired. An example may be changing wheel types or hub cap types, changing spoilers, fenders, or other attachments, or variations in colour of an object.

In determining that a database of models does not include a sufficient model and generating a new machine-generated model, simulations may be generated that are more useful and more realistic. Rather than settling for a best match, the methods described above involve creating an improved simulation based on a machine-generated model whose dimensions are closer to the real object, and are therefore more accurate. A simulation may be generated more quickly based on a machine-generated model, before a more realistic simulation is obtained when a new user-validated model has been generated. Accordingly, the overall quality of simulations for use in training or validation datasets for machine-learning is improved.

Figure 7:
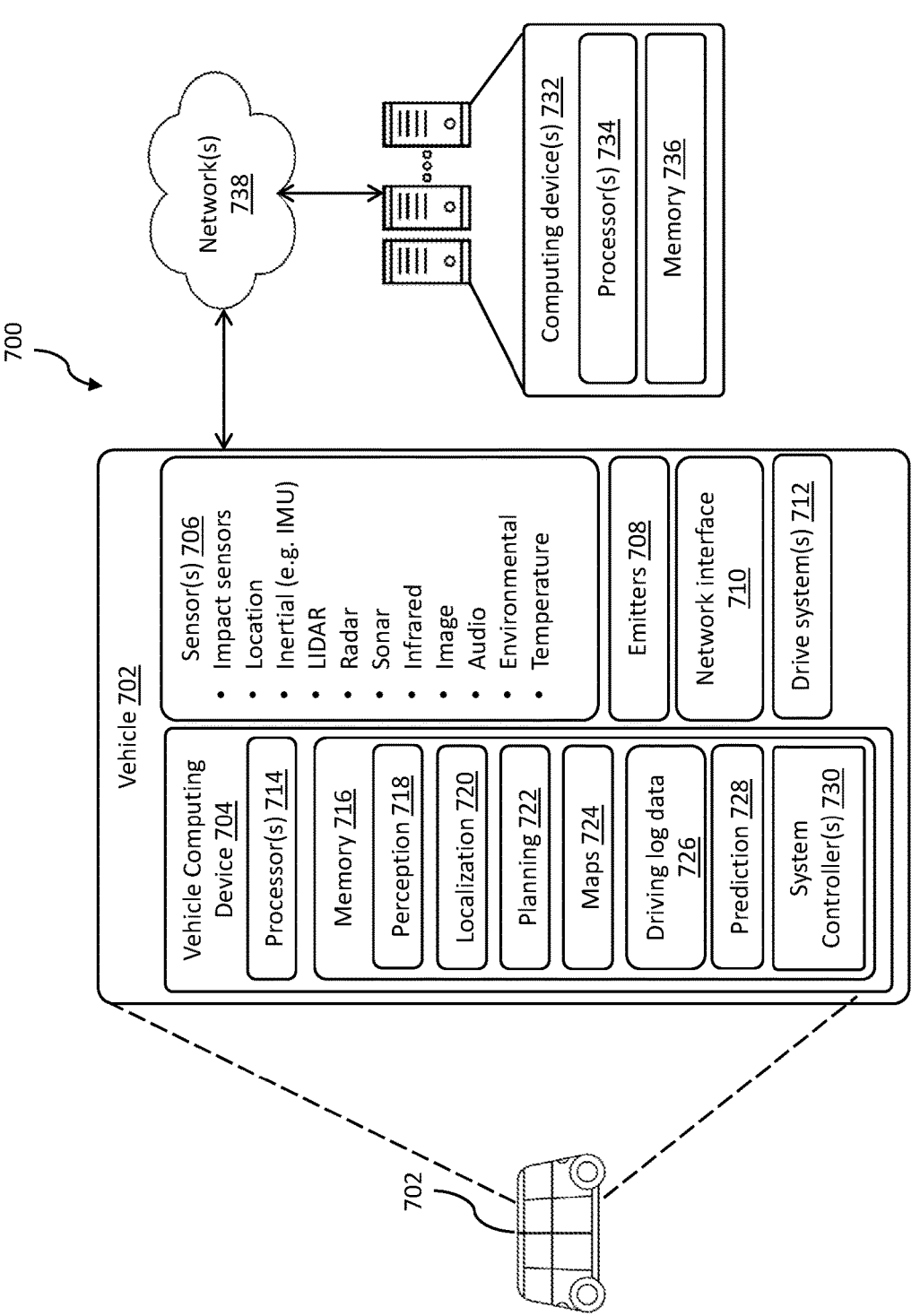
FIG. 7 is a block diagram illustrating an example vehicle system according to the present invention.

FIG. 7 illustrates a block diagram of an example system 700 that implements the techniques discussed herein. FIG. 7 may represent vehicle system 108 and computing device(s) 128 of FIG. 1. In some instances, the example system 700 may include a vehicle 702, which may represent the vehicle 102 in FIG. 1. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 may include a vehicle computing device(s) 704, sensor(s) 706, emitter(s) 708, network interface(s) 710, and/or drive system(s) 712. Sensor(s) 706 may represent sensor(s) 106. The system 700 may additionally or alternatively comprise computing device(s) 732.

In some instances, the sensor(s) 706 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 732.

The vehicle 702 may also include emitter(s) 708 for emitting light and/or sound, as described above. The emitter(s) 708 may include interior audio and visual emitter(s) to communicate with passengers of the vehicle 702. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). The network interface(s) 710 may facilitate communication with other local computing device(s) on the vehicle 702 and/or the drive component(s) 712. The network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 732 over a network 738. In some examples, computing device(s) 732 may comprise one or more nodes of a distributed computing system (e.g., a cloud computing architecture).

The vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device(s) 704 may include processor(s) 714 and memory 716 communicatively coupled with the one or more processors 714. Computing device(s)

732 may also include processor(s) 734, and/or memory 736. The processor(s) 714 and/or 734 may be any suitable processor capable of executing instructions to process data and perform operations as described herein. By way of example and not limitation, the processor(s) 714 and/or 734 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 716 and/or 736 may be examples of non-transitory computer-readable media. The memory 716 and/or 736 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 716 and/or memory 736 may store a perception component 718, localization component 720, planning component 722, map(s) 724, driving log data 726, prediction component 728, and/or system controller(s) 730—zero or more portions of any of which may be hardware, such as GPU(s), CPU(s), and/or other processing units. Simulation system 738 may represent simulator 130.

The perception component 718 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 718 is referred to as perception data. The perception component 718 may be configured to associate a bounding region (or other indication) with an identified object. The perception component 718 may be configured to associate a confidence score associated with a classification of the identified object with an identified object. In some examples, objects, when rendered via a display, can be colored based on their perceived class. The object classifications determined by the perception component 718 may distinguish between different object types such as, for example, a passenger vehicle, a pedestrian, a bicyclist, motorist, a delivery truck, a semi-truck, traffic signage, and/or the like.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include and/or request/receive map(s) 724 of an environment and can continuously determine a location, velocity, and/or orientation of the autonomous vehicle 702 within the map(s) 724. In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the perception component 718, a location and/or orientation of the vehicle 702 relative to the environment and/or sensor data associated therewith.

The planning component 722 may receive a location and/or orientation of the vehicle 702 from the localization component 720 and/or perception data from the perception component 718 and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 730 and/or drive component(s) 712 may parse/cause to be carried out, second instructions for the emitter(s) 708 may be formatted according to a second format associated therewith).

The driving log data 726 may comprise sensor data, perception data, and/or scenario labels collected/determined by the vehicle 702 (e.g., by the perception component 718), as well as any other message generated and or sent by the vehicle 702 during operation including, but not limited to, control messages, error messages, etc. In some examples, the vehicle 702 may transmit the driving log data 726 to the computing device(s) 732. The computing device(s) 732 may identify one or more scenarios based at least in part on the log data, which may also comprise defining a scenario, wherein the scenarios are used to generate a playback simulation. For example, the computing device(s) 732 may determine an environmental layout, a number, type, and a configuration of object(s) in the environment and/or associate this definition with one or more portions of log data associated with that scenario. In some examples, the driving log data 726 may comprise (historical) perception data that was generated on the vehicle 702 during operation of the vehicle.

The prediction component 728 may generate one or more probability maps representing prediction probabilities of possible locations of one or more objects in an environment. For example, the prediction component 728 may generate one or more probability maps for vehicles, pedestrians, animals, and the like within a threshold distance from the vehicle 702. In some examples, the prediction component 728 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 722 may be communicatively coupled to the prediction component 728 to generate predicted trajectories of objects in an environment. For example, the prediction component 728 may generate one or more predicted trajectories for objects within a threshold distance from the vehicle 702. In some examples, the prediction component 728 may measure a trace of an object and generate a trajectory for the object based on observed and predicted behavior. Although prediction component 728 is shown on a vehicle 702 in this example, the prediction component 728 may also be provided elsewhere, such as in a remote computing device. In some examples, a prediction component may be provided at both a vehicle and a remote computing device. These components may be configured to operate according to the same or a similar algorithm.

The memory 716 and/or 736 may additionally or alternatively store a mapping system, a planning system, a ride management system, etc. Although perception component 718 and/or planning component 722 are illustrated as being stored in memory 716, perception component 718 and/or planning component 722 may include processor-executable instructions, machine-learned model(s) (e.g., a neural network), and/or hardware.

As described herein, the localization component 720, the perception component 718, the planning component 722, the simulation system 738, and/or other components of the system 700 may comprise one or more ML models. For example, the localization component 720, the perception component 718, the planning component 722, and/or the simulation system 738 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 720 may additionally or alternatively store one or more system controller(s) 730, which may be configured to control steering, propulsion, braking, safety, emitters, communication, and other systems of the vehicle 702. These system controller(s) 730 may communicate with and/or control corresponding systems of the drive component(s) 712 and/or other components of the vehicle 702.

It should be noted that while FIG. 7 is illustrated as a distributed system, in alternative examples, components of the vehicle 702 may be associated with the computing device(s) 732 and/or components of the computing device(s) 732 may be associated with the vehicle 702. That is, the vehicle 702 may perform one or more of the functions associated with the computing device(s) 732, and vice versa.

EXAMPLE CLAUSES

A: a system comprising: one or more processors; and non-transitory memory storing processor-executable instructions that, when executed by the one or more processors, cause the system to perform actions including: accessing a driving log associated with an autonomous vehicle in an environment, the driving log comprising data indicating an object; determining that a database of validated models of simulated objects lacks a validated model for the object based at least in part on comparing data of the driving log corresponding to the object and data associated with the database; generating, based at least in part on the determining that the database lacks the valid model, a first, machine-generated model for the object based at least in part on sensor data in the driving log corresponding to the object, wherein the sensor data includes visual or geometric data; and generating a first driving simulation including the machine-generated model and based at least in part on the driving log.

B: a system as clause A describes, wherein the instructions, when executed by the one or more processors, cause the system to perform actions including: requesting creation of a second model for the object by a designer; receiving the second model; generating a second driving simulation including the second model and based at least in part on the driving log.

C: a system as clause B describes, wherein the instructions, when executed by the one or more processors, cause the system to perform actions including: determining, from the driving log, the sensor data corresponding to the object comprising geometric data and visual data; generating a mesh, surface, or envelope for the object based on the sensor data; using the mesh, surface, or envelope as the first machine-generated model; providing the first, machine-generated model to the designer; overlaying, to the mesh, surface, or envelope, additional information comprising at least one of color information, feature information, or material information based at least in part on the visual data; and using the mesh, surface, or envelope overlaid with the additional information as the second model.

D: a system as any of clauses A to C describe, wherein the instructions, when executed by the one or more processors, cause the system to perform actions including: determining a confidence score associated with the first driving simulation based at least in part on the difference between the machine-generated model and the object.

E: a system as any of clauses A to D describe, wherein the instructions, when executed by the one or more processors, cause the system to perform actions including: determining a first value for a characteristic associated with the object based at least in part on the driving log, wherein the characteristic comprises at least one of a dimension, a color, a texture, a shape, a bounding box size, or a classification; determining a second value for the characteristic associated with at least one validated model of the database; and determining that the database lacks a validated model based at least in part on a mismatch between the first and second values.

F: a method, comprising: receiving, by a processor, log data associated with a vehicle in an environment; identifying, by the processor, an object in the environment based at least in part on the log data; determining, by the processor and based at least in part on the log data, that a plurality of models does not contain a sufficient model for representing the object in a driving simulation; and generating, by the processor and based at least in part on the plurality of models not containing the sufficient model, a machine-generated model of a simulated object for representing the object in the driving simulation wherein the model is generated based at least in part on the log data; and generating, by the processor, the driving simulation including the model of the simulated object based at least in part on the log data.

G: a method as clause F describes, wherein the machine-generated model of the simulated object comprises a mesh, a surface, a grid, or an envelope.

H: a method as clause F or clause G describe, wherein the machine-generated model is generated based on sensor data from the log data.

I: a method as any of clauses F to H describe, comprising generating a neural radiance field corresponding to the object based on the log data, wherein the machine-generated model of the simulated object is based on the neural radiance field.

J: a method as any of clauses F to I describe, comprising, after generating the machine-generated model of the simulated object: receiving a further model of the simulated object for representing the object in an updated driving simulation, wherein the further model of the simulated object comprises a user-validated model; and generating the updated driving simulation including the further model of the simulated object based at least in part on the log data.

K: a method as clause J describes, comprising: generating a request for the further model of the simulated object based at least in part on generating the model of the simulated object, the request comprising data associated with the model of the simulated object, wherein the further model is received in response to the request.

L: a method as clause J or clause K describe, comprising: determining a value associated with the driving simulation that indicates an ability of the system to represent the object as the model of the simulated object in the driving simulation; and updating the value based on at least one of the further model or the updated driving simulation.

M: a method as any of clauses J to L describe, wherein the further model is based on the machine-generated model of the simulated object and/or a best-match model from the plurality of models.

N: a method as any of clauses F to M describe, wherein the plurality of models comprises user-validated models.

O: one or more non-transitory computer-readable media storing instructions executable by a processor, wherein the instructions, when executed, cause the processor to perform actions including: receiving, by a processor, log data associated with a vehicle in an environment; identifying, by the processor, an object in the environment based at least in part on the log data; determining, by the processor and based at least in part on the log data, that a plurality of models does not contain a sufficient model for representing the object in a driving simulation; and generating, by the processor and based at least in part on the plurality of models not containing the sufficient model, a machine-generated model of a simulated object for representing the object in the driving simulation wherein the model is generated based at least in part on the log data; and generating, by the processor, the driving simulation including the model of the simulated object based at least in part on the log data.

P: a computer-readable media as clause O describes, wherein the machine-generated model of the simulated object comprises a mesh, a surface, a grid, or an envelope.

Q: a computer-readable media as clause O or clause P describe, wherein the machine-generated model is generated based on sensor data from the log data.

R: a computer-readable media as any of clauses O to Q describe, wherein the instructions, when executed, cause the processor to perform actions including: generating a neural radiance field corresponding to the object based on the log data, wherein the machine-generated model of the simulated object is based on the neural radiance field.

S: a computer-readable media as any of clauses O to R describe, wherein the instructions, when executed, cause the processor to perform actions including, after generating the machine-generated model of the simulated object: receiving a further model of the simulated object for representing the object in an updated driving simulation, wherein the further model of the simulated object comprises a user-validated model; and generating the updated driving simulation including the further model of the simulated object based at least in part on the log data.

T: a computer-readable media as clause S describes, wherein the instructions, when executed, cause the processor to perform actions including: generating a request for the further model of the simulated object based at least in part on generating the model of the simulated object, the request comprising data associated with the model of the simulated object, wherein the further model is received in response to the request.

U: a computer-readable media as clause S or clause T describe, wherein the instructions, when executed, cause the processor to perform actions including: determining a value associated with the driving simulation that indicates an ability of the system to represent the object as the model of the simulated object in the driving simulation; and updating the value based on at least one of the further model or the updated driving simulation.

V: a computer-readable media as any of clauses S to U describe, wherein the further model is based on the machine-generated model of the simulated object and/or a best-match model from the plurality of models.

W: a computer-readable media as any of clauses O to V describe, wherein the plurality of models comprises user-validated models.

X: A system comprising: one or more processors; and non-transitory memory storing processor-executable instructions that, when executed by the one or more processors, cause the system to perform actions including: accessing a driving log associated with a first autonomous vehicle in an environment, the driving log comprising data relating to the environment and at least one object within the environment; generating a driving simulation including a simulated environment representing the environment and at least one simulated object representing the at least one object based at least in part on the driving log; determining at least one confidence score for the driving simulation, wherein the at least one confidence score indicates an ability of the system to represent the at least one object of the driving log as the at least one simulated object in the simulation; determining, based at least in part on the at least one confidence score, to include the driving simulation in a dataset to validate a machine-learned model of a second autonomous vehicle; and validating the machine-learned model of the second autonomous vehicle.

Y: a system as clause X describes, wherein the confidence score is based at least in part on a lack of a model for the at least one simulated object to represent the at least one object.

Z: a system as clause X or clause Y describes, wherein the at least one confidence score is based at least in part on an absence of data for the at least one object in the driving log to fully render the at least one simulated object.

AA: a system as clause Z describes, wherein the absence of the data is an absence of location data corresponding to a location of the at least one object or a portion of the least one object.

AB: a system as any of clauses X to AA describe, wherein the at least one confidence score is based on at least one of: a distance of the at least one object from the first autonomous vehicle based at least in part on the driving log; a reliance on the at least one simulated object for determining an action by a planning component of the first autonomous vehicle based at least in part on the driving log; or a purpose of the driving simulation.

AC: A system comprising: one or more processors; and non-transitory memory storing processor-executable instructions that, when executed by the one or more processors, cause the system to perform actions including: receiving a driving log associated with a vehicle; determining, from the driving log, log data that represents a driving scenario; determining, based at least in part on the log data, at least one feature of the driving scenario; generating a driving simulation of the driving scenario based at least in part on the log data; determining a value for the driving simulation that indicates an ability of the system to represent the at least one feature of the driving scenario in the driving simulation; and storing the driving simulation in a database of driving simulations and storing the value in association with at least one of: the driving simulation, data indicating the driving simulation, or data determined by executing the driving simulation.

AD: a system as clause AC describes, wherein the instructions, when executed by the one or more processors, cause the system to perform actions including: generating the driving simulation of the driving scenario based at least in part on at least one of stored map data or stored road network data; determining that the driving simulation comprises the at least one feature based at least in part on the stored map data or the stored road network data; and determining the value based at least in part on determining that the driving simulation comprises the at least one feature.

AE: a system as clause AC or clause AD describe, wherein the instructions, when executed by the one or more processors, cause the system to perform actions including: determining, based at least in part on the log data, that the system has limited or no ability to represent the at least one feature of the driving scenario; and determining the value based at least in part on determining that the system has limited or no ability to represent the at least one feature.

AF: a system as clause AE describes, wherein the system has limited or no ability to represent the at least one feature due to a lack of data corresponding to the at least one feature in the log data.

AG: a system as any of clauses AC to AF describe, wherein the value is based at least in part on one or more of: a distance of the at least one feature from the vehicle; a reliance on the at least one feature by the vehicle to perform an action; or a purpose of the driving simulation.

AH: a system as any of clauses AC to AG describe, wherein the instructions, when executed by the one or more processors, cause the system to perform actions including: accessing a database comprising a plurality of simulated features; determining a simulated feature of the plurality of simulated features for representing the at least one feature in the driving simulation based at least in part on the log data; determining a difference between the at least one feature and the simulated feature; and determining the value based at least in part on the difference.

AI: a system as clause AH describes, wherein the difference comprises at least one of: a shape difference; a size difference; a difference in material; a textural difference; or a color difference.

AJ: a system as any of clauses AC to AI describe, wherein the value comprises an overall value and the at least one feature comprises a first feature and a second feature, and wherein the instructions, when executed by the one or more processors, cause the system to perform actions including: determining a first value that indicates an ability of the system to represent the first feature in the driving simulation based at least in part on the log data; determining a second value that indicates an ability of the system to represent the second feature in the driving simulation based at least in part on the log data; and determining the overall value based at least in part on the first value and the second value.

AK: a system as any of clauses AC to AJ describe, wherein the instructions, when executed by the one or more processors, cause the system to perform actions including: executing the driving simulation; determining, based on executing the driving simulation, data associated with the driving simulation; and determining the value for the driving simulation based at least in part on at least one of executing the driving simulation or the data associated with the driving simulation.

AL: a system as any of clauses AC to AK describe, wherein the instructions, when executed by the one or more processors, cause the system to perform actions including: determining that the value is less than a threshold value; and performing a further action based at least in part on determining that the value is less than the threshold value.

AM: a system as clause AL describes, wherein the further action comprises at least one of: marking the driving simulation to indicate that the value is less than the threshold value; generating a request for user input; generating a new driving simulation based at least in part on the driving log, the new driving simulation including a new simulated feature corresponding to the at least one feature, wherein the new simulated feature is different to a simulated feature corresponding to the at least one feature found in the driving simulation.

AN: a system as any of clauses AC to AM describe, wherein the instructions, when executed by the one or more processors, cause the system to perform actions including: presenting the data associated with the driving simulation and the value to a user in an ordered list comprising data associated with a plurality of driving simulations and associated values.

AO: One or more non-transitory computer-readable media storing instructions executable by a processor, wherein the instructions, when executed, cause the processor to perform actions including: receiving a driving log associated with a vehicle; determining, from the driving log, log data that represents a driving scenario; determining, based at least in part on the log data, at least one feature of the driving scenario; generating a driving simulation of the driving scenario based at least in part on the log data; determining a value for the driving simulation that indicates an ability of the processor to represent the at least one feature of the driving scenario in the driving simulation; and storing the driving simulation in a database of driving simulations and storing the value in association with at least one of: the driving simulation, data indicating the driving simulation, or data determined by executing the driving simulation.

AP: a computer-readable media as clause AO describes, wherein the instructions, when executed, cause the processor to perform actions including: generating the driving simulation of the driving scenario based at least in part on at least one of stored map data or stored road network data; determining that the driving simulation comprises the at least one feature based at least in part on the stored map data or the stored road network data; and determining the value based at least in part on determining that the driving simulation comprises the at least one feature.

AQ: a computer-readable media as clause AO or clause AP describes, wherein the instructions, when executed, cause the processor to perform actions including: determining, based at least in part on the log data, that the processor has limited or no ability to represent the at least one feature of the driving scenario; and determining the value based at least in part on determining that the processor has limited or no ability to represent the at least one feature.

AR: a computer-readable media as clause AQ describes, wherein the processor has limited or no ability to represent the at least one feature due to a lack of data corresponding to the at least one feature in the log data.

AS: a computer-readable media as any of clauses AO to AR describe, wherein the value is based at least in part on one or more of: a distance of the at least one feature from the vehicle; a reliance on the at least one feature by the vehicle to perform an action; or a purpose of the driving simulation.

AT: a computer-readable media as any of clauses AO to AS describe, wherein the instructions, when executed, cause the processor to perform actions including: accessing a database comprising a plurality of simulated features; determining a simulated feature of the plurality of simulated features for representing the at least one feature in the driving simulation based at least in part on the log data; determining a difference between the at least one feature and the simulated feature; and determining the value based at least in part on the difference.

AU: a computer-readable media as clause AT describes, wherein the difference comprises at least one of: a shape difference; a size difference; a difference in material; a textural difference; or a color difference.

AV: a computer-readable media as any of clauses AO to AU describe, wherein the value comprises an overall value and the at least one feature comprises a first feature and a second feature, and wherein the instructions, when executed, cause the processor to perform actions including: determining a first value that indicates an ability of the processor to represent the first feature in the driving simulation based at least in part on the log data; determining a second value that indicates an ability of the processor to represent the second feature in the driving simulation based at least in part on the log data; and determining the overall value based at least in part on the first value and the second value.

AW: a computer-readable media as any of clauses AO to AV describe, wherein the instructions, when executed, cause the processor to perform actions including: executing the driving simulation; determining, based on executing the driving simulation, data associated with the driving simulation; and determining the value for the driving simulation based at least in part on at least one of executing the driving simulation or the data associated with the driving simulation.

AX: a computer-readable media as any of clauses AO to AW describe, wherein the instructions, when executed, cause the processor to perform actions including: determining that the value is less than a threshold value; and performing a further action based at least in part on determining that the value is less than the threshold value.

AY: a computer-readable media as clause AX describes, wherein the further action comprises at least one of: marking the driving simulation to indicate that the value is less than the threshold value; generating a request for user input; generating a new driving simulation based at least in part on the driving log, the new driving simulation including a new simulated feature corresponding to the at least one feature, wherein the new simulated feature is different to a simulated feature corresponding to the at least one feature found in the driving simulation.

AZ: a computer-readable media as any of clauses AO to AY describe, wherein the instructions, when executed, cause the processor to perform actions including: presenting the data associated with the driving simulation and the value to a user in an ordered list comprising data associated with a plurality of driving simulations and associated values.

While the example clauses described above are described with respect to one particular implementation, it should be understood that, in the context of this document, the content of the example clauses can also be implemented via a method, device, system, computer-readable medium, and/or another implementation. Additionally, any of examples A-AZ may be implemented alone or in combination with any other one or more of the examples A-AZ.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
non-transitory memory storing processor-executable instructions that, when executed by the one or more processors, cause the system to perform actions including:
accessing a driving log associated with an autonomous vehicle in an environment, the driving log comprising data indicating an object;
determining that a database of validated models of simulated objects lacks a validated simulation model for simulating the object based at least in part on comparing data of the driving log corresponding to the object and data associated with the database;
generating, based at least in part on the determining that the database lacks the validated simulation model, a first, machine-generated simulation model for simulating the object based at least in part on sensor data in the driving log corresponding to the object, wherein the sensor data includes visual or geometric data; and
generating a first driving simulation including the machine-generated simulation model and based at least in part on the driving log.

2. The system of claim 1, wherein the instructions, when executed by the one or more processors, cause the system to perform actions including:
requesting creation of a second model for the object by a designer;
receiving the second model;
generating a second driving simulation including the second model and based at least in part on the driving log.

3. The system of claim 2, wherein the instructions, when executed by the one or more processors, cause the system to perform actions including:
determining, from the driving log, the sensor data corresponding to the object comprising geometric data and visual data;
generating a mesh, surface, or envelope for the object based on the sensor data;
using the mesh, surface, or envelope as the first machine-generated simulation model;
providing the first, machine-generated simulation model to the designer;
overlaying, to the mesh, surface, or envelope, additional information comprising at least one of color information, feature information, or material information based at least in part on the visual data; and using the mesh, surface, or envelope overlaid with the additional information as the second model.

4. The system of claim 1, wherein the instructions, when executed by the one or more processors, cause the system to perform actions including:

determining a confidence score associated with the first driving simulation based at least in part on the difference between the machine-generated simulation model and the object.

5. The system of claim 1, wherein the instructions, when executed by the one or more processors, cause the system to perform actions including:

determining a first value for a characteristic associated with the object based at least in part on the driving log, wherein the characteristic comprises at least one of a dimension, a color, a texture, a shape, a bounding box size, or a classification;

determining a second value for the characteristic associated with at least one validated model of the database; and determining that the database lacks a validated model based at least in part on a mismatch between the first and second values.

6. A method, comprising:

receiving, by a processor, log data associated with a vehicle in an environment;

identifying, by the processor, an object in the environment based at least in part on the log data;

determining, by the processor and based at least in part on the log data, that a plurality of simulation models does not contain a sufficient simulation model for representing the object in a driving simulation; and generating, by the processor and based at least in part on the plurality of simulation models not containing the sufficient simulation model, a machine-generated simulation model of a simulated object for representing the object in the driving simulation wherein the simulation model is generated based at least in part on the log data; and generating, by the processor, the driving simulation including the simulation model of the simulated object based at least in part on the log data.

7. The method of claim 6, wherein the machine-generated simulation model of the simulated object comprises a mesh, a surface, a grid, or an envelope.

8. The method of claim 6, wherein the machine-generated simulation model is generated based on sensor data from the log data.

9. The method of claim 6, comprising generating a neural radiance field corresponding to the object based on the log data, wherein the machine-generated simulation model of the simulated object is based on the neural radiance field.

10. The method of claim 6, comprising, after generating the machine-generated simulation model of the simulated object:

receiving a further model of the simulated object for representing the object in an updated driving simulation, wherein the further model of the simulated object comprises a user-validated model; and generating the updated driving simulation including the further model of the simulated object based at least in part on the log data.

11. The method of claim 10, comprising:

generating a request for the further model of the simulated object based at least in part on generating the model of the simulated object, the request comprising data associated with the model of the simulated object, wherein the further model is received in response to the request.

12. The method of claim 10, comprising:

determining a value associated with the driving simulation that indicates an ability of the system to represent the object as the simulation model of the simulated object in the driving simulation; and updating the value based on at least one of the further model or the updated driving simulation.

13. The method of claim 10, wherein the further model is based on the machine-generated simulation model of the simulated object and/or a best-match model from the plurality of models.

14. The method of claim 6, wherein the plurality of simulation models comprises user-validated models.

15. One or more non-transitory computer-readable media storing instructions executable by a processor, wherein the instructions, when executed, cause the processor to perform actions including:

receiving, by a processor, log data associated with a vehicle in an environment;

identifying, by the processor, an object in the environment based at least in part on the log data;

determining, by the processor and based at least in part on the log data, that a plurality of simulation models does not contain a sufficient simulation model for representing the object in a driving simulation; and generating, by the processor and based at least in part on the plurality of simulation models not containing the sufficient simulation model, a machine-generated simulation model of a simulated object for representing the object in the driving simulation wherein the simulation model is generated based at least in part on the log data; and generating, by the processor, the driving simulation including the simulation model of the simulated object based at least in part on the log data.

16. The one or more non-transitory computer-readable media of claim 15, wherein the instructions, when executed, cause the processor to perform actions including, after generating the machine-generated model of the simulated object:

receiving a further model of the simulated object for representing the object in an updated driving simulation, wherein the further model of the simulated object comprises a user-validated model; and generating the updated driving simulation including the further model of the simulated object based at least in part on the log data.

17. The one or more non-transitory computer-readable media of claim 16, wherein the instructions, when executed, cause the processor to perform actions including:

generating a request for the further model of the simulated object based at least in part on generating the model of the simulated object, the request comprising data associated with the model of the simulated object, wherein the further model is received in response to the request.

18. The one or more non-transitory computer-readable media of claim 16, wherein the instructions, when executed, cause the processor to perform actions including:

determining a value associated with the driving simulation that indicates an ability of the system to represent the object as the simulation model of the simulated object in the driving simulation; and updating the value based on at least one of the further model or the updated driving simulation.

19. The one or more non-transitory computer-readable media of claim 16, wherein the further model is based on the machine-generated simulation model of the simulated object and/or a best-match model from the plurality of models.

20. The one or more non-transitory computer-readable media of claim 15, wherein the plurality of simulation models comprises user-validated models, and wherein the machine-generated simulation model of the simulated object comprises a mesh, a surface, a grid, or an envelope.

* * * * *